United States Patent
Gadde et al.

(10) Patent No.: US 12,373,648 B2
(45) Date of Patent: Jul. 29, 2025

(54) COMPOSITE ENTITY FOR RULE DRIVEN ACQUISITION OF INPUT DATA TO CHATBOTS

(71) Applicant: Oracle International Corporation, Redwood Shores, CA (US)

(72) Inventors: Srinivasa Phani Kumar Gadde, Fremont, CA (US); Manish Parekh, San Jose, CA (US); Steven Martijn Davelaar, Amsterdam (NL); Manmohit Rekhi, Herdon, VA (US)

(73) Assignee: Oracle International Corporation, Redwood Shores (CA)

( * ) Notice: Subject to any disclaimer, the term of this patent is extended or adjusted under 35 U.S.C. 154(b) by 14 days.

(21) Appl. No.: 18/618,760

(22) Filed: Mar. 27, 2024

(65) Prior Publication Data

US 2024/0242034 A1    Jul. 18, 2024

Related U.S. Application Data

(63) Continuation of application No. 18/113,594, filed on Feb. 23, 2023, now Pat. No. 11,989,523, which is a continuation of application No. 16/857,512, filed on Apr. 24, 2020, now Pat. No. 11,651,162.

(60) Provisional application No. 62/900,392, filed on Sep. 13, 2019, provisional application No. 62/839,580, filed on Apr. 26, 2019.

(51) Int. Cl.
| | |
|---|---|
| G06F 17/00 | (2019.01) |
| G06F 40/295 | (2020.01) |
| G06F 40/30 | (2020.01) |
| H04L 67/10 | (2022.01) |

(52) U.S. Cl.
CPC .......... *G06F 40/30* (2020.01); *G06F 40/295* (2020.01); *H04L 67/10* (2013.01)

(58) Field of Classification Search
None
See application file for complete search history.

(56) References Cited

U.S. PATENT DOCUMENTS

| | | | |
|---|---|---|---|
| 10,008,196 B2 * | 6/2018 | Maisonnier | G06N 3/008 |
| 10,204,097 B2 * | 2/2019 | Lipton | G06N 3/006 |

(Continued)

FOREIGN PATENT DOCUMENTS

| | | |
|---|---|---|
| CA | 3142624 A1 | 12/2020 |
| WO | 2021202569 A1 | 10/2021 |

*Primary Examiner* — Satwant K Singh
(74) *Attorney, Agent, or Firm* — Kilpatrick Townsend & Stockton LLP

(57) ABSTRACT

The present disclosure relates to chatbot systems, and more particularly, to techniques for obtaining data items for input to a chatbot. In certain embodiments, a chatbot system includes a component that can be invoked by a chatbot in the chatbot system to obtain data items needed by the chatbot. The component can be invoked based on a reference to the component in a dialog flow definition configured for the chatbot. The reference to the component can indicate a composite entity that the component will use to determine how the data items are obtained from a user. The composite entity acts as a container for the data items and may be configured separately from the dialog flow definition of the chatbot. The data items can be obtained based on rules specified in a composite entity definition configured for the composite entity.

20 Claims, 8 Drawing Sheets

(56) References Cited

U.S. PATENT DOCUMENTS

| | | |
|---|---|---|
| 10,291,559 B1 | 5/2019 | Snider et al. |
| 11,651,162 B2 | 5/2023 | Gadde et al. |
| 2019/0132264 A1* | 5/2019 | Jafar Ali ............... G06F 40/295 |
| 2019/0377790 A1 | 12/2019 | Redmond et al. |
| 2020/0244700 A1 | 7/2020 | Moon et al. |
| 2020/0311204 A1 | 10/2020 | Gupta et al. |
| 2021/0142291 A1 | 5/2021 | Laxman et al. |
| 2021/0144107 A1* | 5/2021 | Liang ....................... G06N 5/04 |
| 2022/0100960 A1* | 3/2022 | Therani ................... G06F 40/35 |
| 2022/0172079 A1* | 6/2022 | Kalandyk ............... G06F 40/35 |

\* cited by examiner

COMPOSITE ENTITY FOR RULE DRIVEN ACQUISITION OF INPUT DATA TO CHATBOTS

CROSS-REFERENCES TO RELATED APPLICATIONS

This application is continuation of U.S. Ser. No. 18/113,594, filed Feb. 23, 2023, which is a continuation of U.S. Non-Provisional application Ser. No. 16/857,512 filed Apr. 24, 2020, now U.S. Pat. No. 11,651,162, issued May 16, 2023, which claims the benefit of and priority to U.S. Provisional Application No. 62/839,580 filed Apr. 26, 2019 and U.S. Provisional Application No. 62/900,392, filed Sep. 13, 2019, the entire contents of which are incorporated herein by reference for all purposes.

TECHNICAL FIELD

The present disclosure relates to chatbot systems, and more particularly, to techniques for obtaining data items for input to a chatbot.

BACKGROUND

Chatbots provide an interface for conversations with human users. Chatbots can be configured to perform various tasks in response to user input provided during a conversation. The user input can be supplied in various forms including, for example, audio input and text input. Thus, natural language understanding (NLU), speech-to-text, and other linguistic processing techniques may be employed as part of the processing performed by a chatbot. In some computing environments, multiple chatbots are available for conversing with a user, with each chatbot handling a different set of tasks.

One of the challenges to implementing a chatbot system is gathering the data that a chatbot needs to process. Depending on the task that the chatbot is to perform, there can be many different types of data used by the chatbot for completing the task. Data items (e.g., values of variables) are often expected to be provided by a user interacting with the chatbot. Typically, the chatbot will prompt the user for each data item as part of a conversation between the chatbot and the user.

BRIEF SUMMARY

The present disclosure relates to chatbot systems, and more particularly, to techniques for obtaining data items (e.g., values of variables) for input to a chatbot. Various embodiments are described herein, including methods, systems, non-transitory computer-readable storage media storing programs, code, or instructions executable by one or more processors, and the like.

An important but challenging functionality for chatbots is the ability to obtain the data that a chatbot will use for performing a task. In particular, it is important to be able to efficiently obtain, from a user, data items that the chatbot will process in connection with performing the task. It is also important to be able to allow a chatbot designer to configure dialog flows for prompting the user for data items, responding to invalid data items (e.g., invalid values) provided by the user, and to configure rules for determining the validity of user supplied data. Further, it can be beneficial to permit the chatbot designer to perform such configuration separately from configuring the overall dialog flow for the chatbot. This would allow the chatbot designer to focus on the general interaction between the chatbot and the user as well as how the chatbot will process data items once the data items have been obtained, and without making the overall dialog flow overly complex by, for example, creating dialog flow states specifically designed to handle the obtaining and validating of the data items.

In certain embodiments, a chatbot system is configured to perform a method involving invoking a chatbot in a dialog flow state configured for the chatbot, and determining that the dialog flow state indicates a composite entity to be filled with data items for processing by the chatbot. The method further involves determining, from a composite entity definition configured for the composite entity, a set of data items to be obtained from a user of the chatbot system and a plurality of rules that specify how the user is to be prompted for the set of data items. The plurality of rules includes, for each data item in the set of data items, at least one rule configured for the data item. The method further involves obtaining the set of data items from the user in accordance with the plurality of rules, and inputting the obtained set of data items to the chatbot for processing.

The foregoing, together with other features and embodiments will become more apparent upon referring to the following specification, claims, and accompanying drawings.

DETAILED DESCRIPTION

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

Described herein are various techniques for obtaining data items (e.g., values of variables) for input to a chatbot. In certain embodiments, a chatbot system includes a component that can be invoked by a chatbot in the chatbot system to obtain data items needed by the chatbot. The component can be invoked based on a reference to the component in a dialog flow definition configured for the chatbot. The reference to the component can indicate a composite entity that the component will use to determine how the data items are obtained from a user. The composite entity acts as a container for the data items and may be configured separately from the dialog flow definition of the chatbot. The data items can be obtained based on rules specified in a composite entity definition configured for the composite entity.

Composite entities provide a way to automate the obtaining of data items. Composite entities provide flexibility for customizing the manner in which data items are obtained and can be configured without requiring a chatbot developer to write custom code for defining how the data items are obtained. For example in certain embodiments, a user interface may be provided for configuring a composite entity with rules (e.g., rules based on business logic) for determining which data items among a set of data items defined for the composite entity are needed by the chatbot, rules for determining whether user provided data items are valid, and dialog flow for prompting a user for the data items. The dialog flow for the composite entity can include dialog for handling different scenarios that occur when the user is prompted for the data items, such as when the user provides an invalid value or multiple values for a variable that has only one value. Thus, the configuration for a composite entity can specify what data items are needed and the manner in which the data items are obtained from the user.

Chatbot System Overview (Example)

Figure 1:
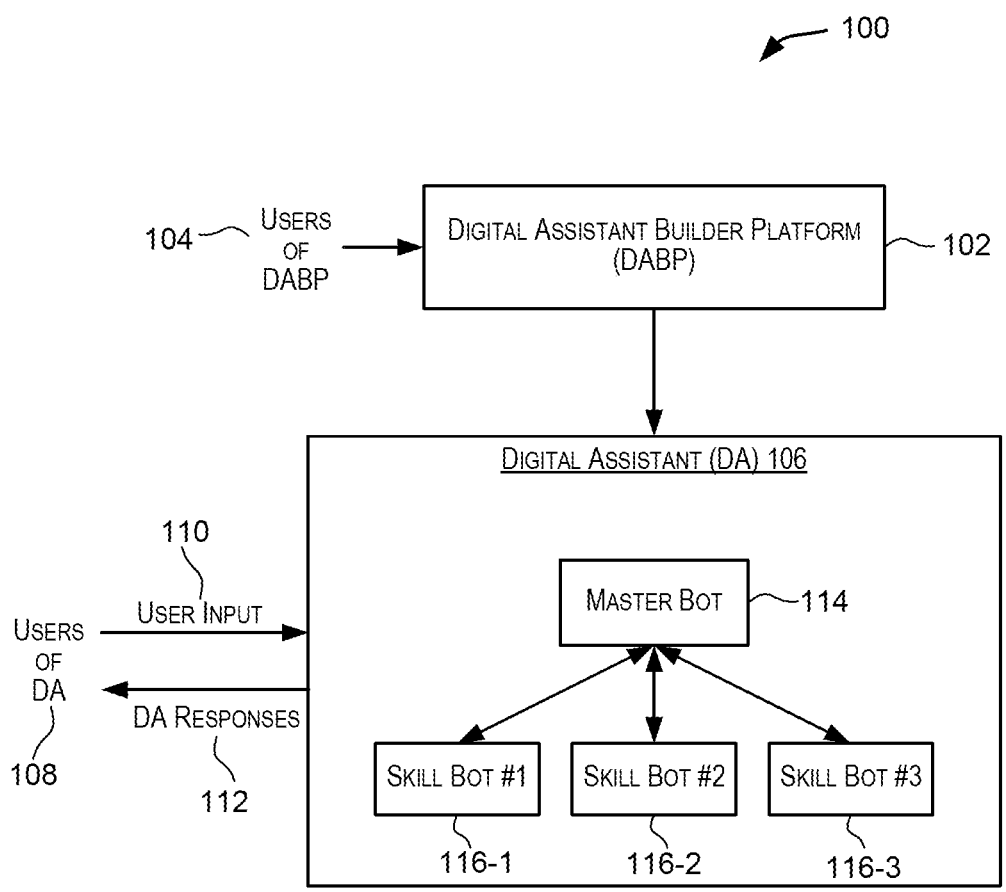
FIG. 1 is a simplified block diagram of a distributed environment incorporating an exemplary embodiment.

FIG. 1 is a simplified block diagram of an environment 100 incorporating a chatbot system according to certain embodiments. Environment 100 comprises a digital assistant builder platform (DABP) 102 that enables users of DABP 102 to create and deploy digital assistants or chatbot systems. DABP 102 can be used to create one or more digital assistants (DAs) or chatbot systems. For example, as shown in FIG. 1, user 104 representing a particular enterprise can use DABP 102 to create and deploy a digital assistant 106 for users of the particular enterprise. For example, DABP 102 can be used by a bank to create one or more digital assistants for use by the bank's customers. The same DABP 102 platform can be used by multiple enterprises to create digital assistants. As another example, an owner of a restaurant (e.g., a pizza shop) may use DABP 102 to create and deploy a digital assistant that enables customers of the restaurant to order food (e.g., order pizza).

For purposes of this disclosure, a "digital assistant" is an entity that helps users of the digital assistant accomplish various tasks through natural language conversations. A digital assistant can be implemented using software only (e.g., the digital assistant is a digital entity implemented using programs, code, or instructions executable by one or more processors), using hardware, or using a combination of hardware and software. A digital assistant can be embodied or implemented in various physical systems or devices, such as in a computer, a mobile phone, a watch, an appliance, a vehicle, and the like. A digital assistant is also sometimes referred to as a chatbot system. Accordingly, for purposes of this disclosure, the terms digital assistant and chatbot system are interchangeable.

A digital assistant, such as digital assistant 106 built using DABP 102, can be used to perform various tasks via natural language-based conversations between the digital assistant and its users 108. As part of a conversation, a user may provide one or more user inputs 110 to digital assistant 106 and get responses 112 back from digital assistant 106. A conversation can include one or more of inputs 110 and responses 112. Via these conversations, a user can request one or more tasks to be performed by the digital assistant and, in response, the digital assistant is configured to perform the user-requested tasks and respond with appropriate responses to the user.

User inputs 110 are generally in a natural language form and are referred to as utterances. A user utterance 110 can be in text form, such as when a user types in a sentence, a question, a text fragment, or even a single word and provides the text as input to digital assistant 106. In some embodiments, a user utterance 110 can be in audio input or speech form, such as when a user says or speaks something that is provided as input to digital assistant 106. The utterances are typically in a language spoken by the user 108. When an utterance is in speech form, the speech input is converted to text form utterances in that particular language and the text utterances are then processed by digital assistant 106. Various speech-to-text processing techniques may be used to convert a speech or audio input to a text utterance, which is then processed by digital assistant 106. In some embodiments, the speech-to-text conversion may be done by digital assistant 106 itself.

An utterance, which may be a text utterance or a speech utterance, can be a fragment, a sentence, multiple sentences, one or more words, one or more questions, combinations of the aforementioned types, and the like. Digital assistant 106 is configured to apply natural language understanding (NLU) techniques to the utterance to understand the meaning of the user input. As part of the NLU processing for an utterance, digital assistant 106 is configured to perform processing to understand the meaning of the utterance, which involves identifying one or more intents and one or more entities corresponding to the utterance. Upon understanding the meaning of an utterance, digital assistant 106 may perform one or more actions or operations responsive to the understood meaning or intents. For purposes of this disclosure, it is assumed that the utterances are text utterances that have been provided directly by a user 108 of digital assistant 106 or are the results of conversion of input speech utterances to text form. This however is not intended to be limiting or restrictive in any manner.

For example, a user 108 input may request a pizza to be ordered by providing an utterance such as "I want to order a pizza." Upon receiving such an utterance, digital assistant 106 is configured to understand the meaning of the utterance and take appropriate actions. The appropriate actions may involve, for example, responding to the user with questions requesting user input on the type of pizza the user desires to order, the size of the pizza, any toppings for the pizza, and the like. The responses provided by digital assistant 106 may also be in natural language form and typically in the same language as the input utterance. As part of generating these responses, digital assistant 106 may perform natural language generation (NLG). For the user ordering a pizza, via the conversation between the user and digital assistant 106, the digital assistant may guide the user to provide all the requisite information for the pizza order, and then at the end of the conversation cause the pizza to be ordered. Digital assistant 106 may end the conversation by outputting information to the user indicating that the pizza has been ordered.

At a conceptual level, digital assistant 106 performs various processing in response to an utterance received from a user. In some embodiments, this processing involves a series or pipeline of processing steps including, for example, understanding the meaning of the input utterance (using NLU), determining an action to be performed in response to the utterance, where appropriate causing the action to be performed, generating a response to be output to the user responsive to the user utterance, outputting the response to the user, and the like. The NLU processing can include parsing the received input utterance to understand the structure and meaning of the utterance, refining and reforming the utterance to develop a better understandable form (e.g., logical form) or structure for the utterance. Generating a response may include using natural language generation (NLG) techniques. Thus, the natural language processing (NLP) performed by a digital assistant can include a combination of NLU and NLG processing.

The NLU processing performed by a digital assistant, such as digital assistant 106, can include various NLU related processing such as sentence parsing (e.g., tokenizing, lemmatizing, identifying part-of-speech tags for the sentence, identifying named entities in the sentence, generating dependency trees to represent the sentence structure, splitting a sentence into clauses, analyzing individual clauses, resolving anaphoras, performing chunking, and the like). In certain embodiments, the NLU processing or portions thereof is performed by digital assistant 106 itself. In some other embodiments, digital assistant 106 may use other resources to perform portions of the NLU processing. For example, the syntax and structure of an input utterance sentence may be identified by processing the sentence using a parser, a part-of-speech tagger, and/or a named entity recognizer. In one implementation, for the English language, a parser, a part-of-speech tagger, and a named entity recognizer such as ones provided by the Stanford NLP Group are used for analyzing the sentence structure and syntax. These are provided as part of the Stanford CoreNLP toolkit.

While the various examples provided in this disclosure show utterances in the English language, this is meant only as an example. In certain embodiments, digital assistant 106 is also capable of handling utterances in languages other than English. Digital assistant 106 may provide subsystems (e.g., components implementing NLU functionality) that are configured for performing processing for different languages. These subsystems may be implemented as pluggable units that can be called using service calls from an NLU core server. This makes the NLU processing flexible and extensible for each language, including allowing different orders of processing. A language pack may be provided for individual languages, where a language pack can register a list of subsystems that can be served from the NLU core server.

A digital assistant, such as digital assistant 106 depicted in FIG. 1, can be made available or accessible to its users 108 through a variety of different channels, such as but not limited to, via certain applications, via social media platforms, via various messaging services and applications (e.g., an instant messaging application), and other applications or channels. A single digital assistant can have several channels configured for it so that it can be run on and be accessed by different services simultaneously.

A digital assistant or chatbot system generally contains or is associated with one or more skills. In certain embodiments, these skills are individual chatbots (referred to as skill bots) that are configured to interact with users and fulfill specific types of tasks, such as tracking inventory, submitting timecards, creating expense reports, ordering food, checking a bank account, making reservations, buying a widget, and the like. For example, for the embodiment depicted in FIG. 1, digital assistant or chatbot system 106 includes skills 116-1, 116-2, and so on. For purposes of this disclosure, the terms "skill" and "skills" are used synonymously with the terms "skill bot" and "skill bots," respectively.

Each skill associated with a digital assistant helps a user of the digital assistant complete a task through a conversation with the user, where the conversation can include a combination of text or audio inputs provided by the user and responses provided by the skill bots. These responses may be in the form of text or audio messages to the user and/or provided using simple user interface elements (e.g., select lists) that are presented to the user for the user to make selections.

There are various ways in which a skill or skill bot can be associated or added to a digital assistant. In some instances, a skill bot can be developed by an enterprise and then added to a digital assistant using DABP 102, e.g., through a user interface provided by DABP 102 for registering the skill bot with the digital assistant. In other instances, a skill bot can be developed and created using DABP 102 and then added to a digital assistant created using DABP 102. In yet other instances, DABP 102 provides an online digital store (referred to as a "skills store") that offers multiple skills directed to a wide range of tasks. The skills offered through the skills store may also expose various cloud services. In order to add a skill to a digital assistant being generated using DABP 102, a user of DABP 102 can access the skills store via DABP 102, select a desired skill, and indicate that the selected skill is to be added to the digital assistant created using DABP 102. A skill from the skills store can be added to a digital assistant as is or in a modified form (for example, a user of DABP 102 may select and clone a particular skill bot provided by the skills store, make customizations or modifications to the selected skill bot, and then add the modified skill bot to a digital assistant created using DABP 102).

Various different architectures may be used to implement a digital assistant or chatbot system. For example, in certain embodiments, the digital assistants created and deployed using DABP 102 may be implemented using a master bot/child (or sub) bot paradigm or architecture. According to this paradigm, a digital assistant is implemented as a master bot that interacts with one or more child bots that are skill bots. For example, in the embodiment depicted in FIG. 1, digital assistant 106 comprises a master bot 114 and skill bots 116-1, 116-2, etc. that are child bots of master bot 114. In certain embodiments, digital assistant 106 is itself considered to act as the master bot.

A digital assistant implemented according to the master-child bot architecture enables users of the digital assistant to interact with multiple skills through a unified user interface, namely via the master bot. When a user engages with a digital assistant, the user input is received by the master bot. The master bot then performs processing to determine the meaning of the user input utterance. The master bot then determines whether the task requested by the user in the utterance can be handled by the master bot itself, else the master bot selects an appropriate skill bot for handling the user request and routes the conversation to the selected skill bot. This enables a user to converse with the digital assistant through a common single interface and still provide the capability to use several skill bots configured to perform specific tasks. For example, for a digital assistant developed for an enterprise, the master bot of the digital assistant may interface with skill bots with specific functionalities, such as a CRM bot for performing functions related to customer relationship management (CRM), an ERP bot for performing functions related to enterprise resource planning (ERP), an HCM bot for performing functions related to human capital management (HCM), etc. This way the end user or consumer of the digital assistant need only know how to access the digital assistant through the common master bot interface and behind the scenes multiple skill bots are provided for handling the user request.

In certain embodiments, in a master bot/child bots infrastructure, the master bot is configured to be aware of the available list of skill bots. The master bot may have access to metadata that identifies the various available skill bots, and for each skill bot, the capabilities of the skill bot including the tasks that can be performed by the skill bot. Upon receiving a user request in the form of an utterance, the master bot is configured to, from the multiple available skill bots, identify or predict a specific skill bot that can best serve or handle the user request. The master bot then routes the utterance (or a portion of the utterance) to that specific skill bot for further handling. Control thus flows from the master bot to the skill bots. The master bot can support multiple input and output channels. In certain embodiments, routing may be performed with the aid of processing performed by one or more available skill bots. For example, as discussed below, a skill bot can be trained to infer an intent for an utterance and to determine whether the inferred intent matches an intent with which the skill bot is configured. Thus, the routing performed by the master bot can involve the skill bot communicating to the master bot an indication of whether the skill bot has been configured with an intent suitable for handling the utterance.

While the embodiment in FIG. 1 shows digital assistant 106 comprising a master bot 114 and skill bots 116-1, 116-2, and 116-3, this is not intended to be limiting. A digital assistant can include various other components (e.g., other systems and subsystems) that provide the functionalities of the digital assistant. These systems and subsystems may be implemented only in software (e.g., code, instructions stored on a computer-readable medium and executable by one or more processors), in hardware only, or in implementations that use a combination of software and hardware.

DABP 102 provides an infrastructure and various services and features that enable a user of DABP 102 to create a digital assistant including one or more skill bots associated with the digital assistant. In some instances, a skill bot can be created by cloning an existing skill bot, for example, cloning a skill bot provided by the skills store. As previously indicated, DABP 102 can provide a skills store or skills catalog that offers multiple skill bots for performing various tasks. A user of DABP 102 can clone a skill bot from the skills store. As needed, modifications or customizations may be made to the cloned skill bot. In some other instances, a user of DABP 102 creates a skill bot from scratch using tools and services offered by DABP 102.

In certain embodiments, at a high level, creating or customizing a skill bot involves the following steps:
(1) Configuring settings for a new skill bot
(2) Configuring one or more intents for the skill bot
(3) Configuring one or more entities for one or more intents
(4) Training the skill bot
(5) Creating a dialog flow for the skill bot
(6) Adding custom components to the skill bot as needed
(7) Testing and deploying the skill bot
Each of the above steps is briefly described below.
(1) Configuring settings for a new skill bot—Various settings may be configured for the skill bot. For example, a skill bot designer can specify one or more invocation names for the skill bot being created. These invocation names, which serve as identifiers for the skill bot, can then be used by users of a digital assistant to explicitly invoke the skill bot. For example, a user can include an invocation name in the user's utterance to explicitly invoke the corresponding skill bot.

(2) Configuring one or more intents and associated example utterances for the skill bot—The skill bot designer specifies one or more intents (also referred to as bot intents) for a skill bot being created. The skill bot is then trained based upon these specified intents. These intents represent categories or classes that the skill bot is trained to infer for input utterances. Upon receiving an utterance, a trained skill bot infers an intent for the utterance, where the inferred intent is selected from the predefined set of intents used to train the skill bot. The skill bot then takes an appropriate action responsive to an utterance based upon the intent inferred for that utterance. In some instances, the intents for a skill bot represent tasks that the skill bot can perform for users of the digital assistant. Each intent is given an intent identifier or intent name. For example, for a skill bot trained for a bank, the intents specified for the skill bot may include "CheckBalance," "TransferMoney," "DepositCheck," and the like.

For each intent defined for a skill bot, the skill bot designer may also provide one or more example utterances that are representative of and illustrate the intent. These example utterances are meant to represent utterances that a user may input to the skill bot for that intent. For example, for the CheckBalance intent, example utterances may include "What's my savings account balance?", "How much is in my checking account?", "How much money do I have in my account," and the like. Accordingly, various permutations of typical user utterances may be specified as example utterances for an intent.

The intents and their associated example utterances are used as training data to train the skill bot. Various different training techniques may be used. As a result of this training, a predictive model is generated that is configured to take an utterance as input and output an intent inferred for the utterance. In some instances, input utterances are provided to an intent analysis engine (e.g., a rules-based or machine-learning based classifier executed by the skill bot), which is configured to use the trained model to predict or infer an intent for the input utterance. The skill bot may then take one or more actions based upon the inferred intent.

(3) Configuring entities for one or more intents of the skill bot—In some instances, additional context may be needed to enable the skill bot to properly respond to a user utterance. For example, there may be situations where a user input utterance resolves to the same intent in a skill bot. For instance, in the above example, utterances "What's my savings account balance?" and "How much is in my checking account?" both resolve to the same CheckBalance intent, but these utterances are different requests asking for different things. To clarify such requests, one or more entities can be added to an intent. Using the banking skill bot example, an entity called AccountType, which defines values called "checking" and "saving" may enable the skill bot to parse the user request and respond appropriately. In the above example, while the utterances resolve to the same intent, the value associated with the AccountType entity is different for the two utterances. This enables the skill bot to perform possibly different actions for the two utterances in spite of them resolving to the same intent. One or more entities can be specified for certain intents configured for the skill bot. Entities are thus used to add context to the intent itself.

Entities help describe an intent more fully and enable the skill bot to complete a user request.

In certain embodiments, there are two types of entities: (a) built-in entities provided by DABP 102, and (2) custom entities that can be specified by a skill bot designer. Built-in entities are generic entities that can be used with a wide variety of bots. Examples of built-in entities include, without limitation, entities related to time, date, addresses, numbers, email addresses, duration, recurring time periods, currencies, phone numbers, URLs, and the like. Custom entities are used for more customized applications. For example, for a banking skill, an AccountType entity may be defined by the skill bot designer that enables various banking transactions by checking the user input for keywords like checking, savings, and credit cards, etc.

(4) Training the skill bot—A skill bot is configured to receive user input in the form of utterances, parse or otherwise process the received input, and identify or select an intent that is relevant to the received user input. As indicated above, the skill bot has to be trained for this. In certain embodiments, a skill bot is trained based upon the intents configured for the skill bot and the example utterances associated with the intents (collectively, the training data), so that the skill bot can resolve user input utterances to one of its configured intents. In certain embodiments, the skill bot uses a predictive model that is trained using the training data and allows the skill bot to discern what users say (or in some cases, are trying to say). DABP 102 provides various different training techniques that can be used by a skill bot designer to train a skill bot, including various machine-learning based training techniques, rules-based training techniques, and/or combinations thereof. In certain embodiments, a portion (e.g., 80%) of the training data is used to train a skill bot model and another portion (e.g., the remaining 20%) is used to test or verify the model. Once trained, the trained model (also sometimes referred to as the trained skill bot) can then be used to handle and respond to user utterances. In certain cases, a user's utterance may be a question that requires only a single answer and no further conversation. In order to handle such situations, a Q&A (question-and-answer) intent may be defined for a skill bot. Q&A intents are created in a similar manner as regular intents. The dialog flow for Q&A intents can be different from that for regular intents. For example, unlike regular intents, the dialog flow for a Q&A intent may not involve prompts for soliciting additional information (e.g., the value for a particular entity) from the user.

(5) Creating a dialog flow for the skill bot—A dialog flow specified for a skill bot describes how the skill bot reacts as different intents for the skill bot are resolved responsive to received user input. The dialog flow defines operations or actions that a skill bot will take, e.g., how the skill bot responds to user utterances, how the skill bot prompts users for input, and how the skill bot returns data. A dialog flow is like a flowchart that is followed by the skill bot. The skill bot designer specifies a dialog flow using a language, such as markdown language. In certain embodiments, a version of YAML called OBotML may be used to specify a dialog flow for a skill bot. The dialog flow definition for a skill bot acts as a model for the conversation itself, one that lets the skill bot designer choreograph the interactions between a skill bot and the users that the skill bot services.

In certain embodiments, the dialog flow definition for a skill bot contains three sections:
 (a) a context section
 (b) a default transitions section
 (c) a states section Context section—The skill bot designer can define variables that are used in a conversation flow in the context section. Other variables that may be named in the context section include, without limitation: variables for error handling, variables for built-in or custom entities, user variables that enable the skill bot to recognize and persist user preferences, and the like.

Default transitions section—Transitions for a skill bot can be defined in the dialog flow states section or in the default transitions section. The transitions defined in the default transition section act as a fallback and get triggered when there are no applicable transitions defined within a state, or the conditions required to trigger a state transition cannot be met. The default transitions section can be used to define routing that allows the skill bot to gracefully handle unexpected user actions.

States section—A dialog flow and its related operations are defined as a sequence of transitory states, which manage the logic within the dialog flow. Each state node within a dialog flow definition names a component that provides the functionality needed at that point in the dialog. States are thus built around the components. A state contains component-specific properties and defines the transitions to other states that get triggered after the component executes.

Special case scenarios may be handled using the states section. For example, there might be times when it is desirable to provide users the option to temporarily leave a first skill they are engaged with to do something in a second skill within the digital assistant. For example, if a user is engaged in a conversation with a shopping skill (e.g., the user has made some selections for purchase), the user may want to jump to a banking skill (e.g., the user may want to ensure that he/she has enough money for the purchase), and then return to the shopping skill to complete the user's order. To address this, the states section in the dialog flow definition of the first skill can be configured to initiate an interaction with the second different skill in the same digital assistant and then return to the original dialog flow.

(6) Adding custom components to the skill bot—As described above, states specified in a dialog flow for a skill bot name components that provide the functionality needed corresponding to the states. Components enable a skill bot to perform functions. In certain embodiments, DABP 102 provides a set of preconfigured components for performing a wide range of functions. A skill bot designer can select one of more of these preconfigured components and associate them with states in the dialog flow for a skill bot. The skill bot designer can also create custom or new components using tools provided by DABP 102 and associate the custom components with one or more states in the dialog flow for a skill bot.

(7) Testing and deploying the skill bot—DABP 102 provides several features that enable the skill bot designer to test a skill bot being developed. The skill bot can then be deployed and included in a digital assistant.

While the description above describes how to create a skill bot, similar techniques may also be used to create a digital assistant (or the master bot). At the master bot or digital assistant level, built-in system intents may be configured for the digital assistant. These built-in system intents are used to identify general tasks that the digital assistant itself (i.e., the master bot) can handle without invoking a skill bot associated with the digital assistant. Examples of system intents defined for a master bot include: (1) Exit: applies when the user signals the desire to exit the current conversation or context in the digital assistant; (2) Help: applies when the user asks for help or orientation; and (3)

UnresolvedIntent: applies to user input that doesn't match well with the Exit and Help intents. The digital assistant also stores information about the one or more skill bots associated with the digital assistant. This information enables the master bot to select a particular skill bot for handling an utterance.

At the master bot or digital assistant level, when a user inputs a phrase or utterance to the digital assistant, the digital assistant is configured to perform processing to determine how to route the utterance and the related conversation. The digital assistant determines this using a routing model, which can be rules-based, AI-based, or a combination thereof. The digital assistant uses the routing model to determine whether the conversation corresponding to the user input utterance is to be routed to a particular skill for handling, is to be handled by the digital assistant or master bot itself per a built-in system intent, or is to be handled as a different state in a current conversation flow.

In certain embodiments, as part of this processing, the digital assistant determines if the user input utterance explicitly identifies a skill bot using its invocation name. If an invocation name is present in the user input, then it is treated as an explicit invocation of the skill bot corresponding to the invocation name. In such a scenario, the digital assistant may route the user input to the explicitly invoked skill bot for further handling. If there is no specific or explicit invocation, in certain embodiments, the digital assistant evaluates the received user input utterance and computes confidence scores for the system intents and the skill bots associated with the digital assistant. The score computed for a skill bot or system intent represents how likely the user input is representative of a task that the skill bot is configured to perform or is representative of a system intent. Any system intent or skill bot with an associated computed confidence score exceeding a threshold value (e.g., a Confidence Threshold routing parameter) is selected as a candidate for further evaluation. The digital assistant then selects, from the identified candidates, a particular system intent or a skill bot for further handling of the user input utterance. In certain embodiments, after one or more skill bots are identified as candidates, the intents associated with those candidate skills are evaluated (using the trained model for each skill) and confidence scores are determined for each intent. In general, any intent that has a confidence score exceeding a threshold value (e.g., 70%) is treated as a candidate intent. If a particular skill bot is selected, then the user utterance is routed to that skill bot for further processing. If a system intent is selected, then one or more actions are performed by the master bot itself according to the selected system intent.

Configuring and Using a Composite Entity

A chatbot system can include a dialog engine that manages dialog flow for one or more skill bots. For example, the dialog engine can be a component in a digital assistant (e.g., DA 106 in FIG. 1) or a component in a particular chatbot within a digital assistant. As indicated above, the dialog flow definition for a chatbot can include a context section and a states section. Typically, the data items (e.g., values for named entities) that are used during execution of a dialog flow are defined in the states section of the dialog flow definition for the chatbot. At least some of these data items may be extracted from user input.

The states specified in the states section of the dialog flow definition manage the logic within the dialog flow. Each state is generally built around a specific component (e.g., a built-in or custom component) that performs a certain function or action. Such actions can range from basic interactions such as receiving user input and outputting response text, to some service-specific action such as fulfilling an order or booking an airplane flight. At runtime, the dialog engine can traverse the states section (e.g., from top to bottom) and execute the components associated with the states. For example, one of the first states that a dialog engine usually encounters is an "Intent" state that calls a "System.Intent" component to resolve a user intent represented in a user utterance to a particular intent configured for the chatbot (e.g., using the rules-based or machine-learning based classifier associated with the chatbot).

Once the user's intent has been matched to a bot intent, the dialog engine may execute a component associated with a state configured for the matching bot intent. For example, if the user inputs "order pizza," the dialog engine may generate a response by executing a component associated with an "OrderPizza" state. Within the OrderPizza state, there may be prompts configured for requesting the user to provide values for one or more data items needed for completing a pizza order (e.g., values for "PizzaType," "PizzaToppings," and "PizzaSize" entities).

In order to gather all the data items by a chatbot (e.g., data items associated with a particular bot intent), the dialog flow should be configured to output information to the user through a logical sequence of prompts, questions, statements, and the like, that elicit the data items from the user. Such a logical sequence can be burdensome to define programmatically and often leads to extremely long dialog flow definitions with complicated state transitions. Further, a chatbot developer may end up writing many custom components and creating many states to call those components. Thus, if the chatbot designer has to specify in the dialog flow definition the prompts to use for requesting data items from users, logic for handling validation of data items, and other data-item-related processing, this may make the dialog flow definition time-consuming to program and difficult for the chatbot designer to follow. Consequently, the user may be prompted for data items at unexpected times, leading to user confusion or frustration. In order to alleviate these problems, the chatbot designer can be provided with the option to make use of a composite entity configured for obtaining data items from the user so that at least some of the data items needed by a chatbot are obtained by passing the composite entity to a special component configured to acquire the contents of the composite entity.

Figure 2:
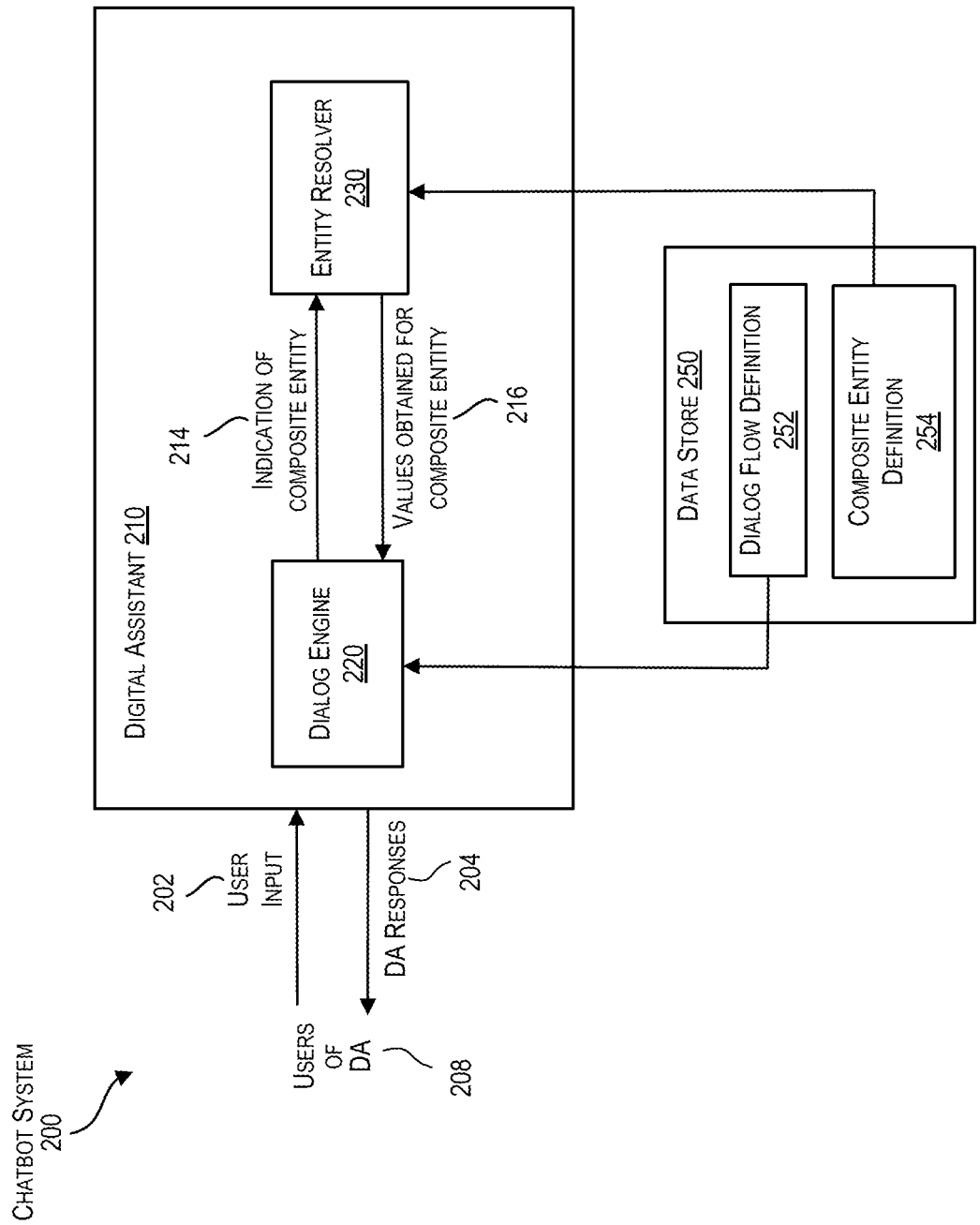
FIG. 2 is a simplified block diagram of a chatbot system configured to use a composite entity according to certain embodiments.

FIG. 2 is a simplified block diagram of a chatbot system 200 configured to use a composite entity according to certain embodiments. The chatbot system 200 can be implemented within the environment 100 in FIG. 1 and includes a digital assistant 210. The digital assistant 210 can be implemented using a master bot/child architecture similar to that depicted in FIG. 1. For simplicity, the chatbots within the digital assistant 210 are omitted from FIG. 2. However, it will be understood that the digital assistant 210 may include at least one chatbot (e.g., a master bot and/or one or more skill bots) that is configured to interact with users 208 of the digital assistant 210. As discussed above, a chatbot may require one or more data items as input to the processing performed by the chatbot, and at least some of these data items are to be provided by a user (e.g., one of the users 208). In order to obtain the data items from the user, the digital assistant 210 is provided with a dialog engine 230 and an entity resolver 240. Both the dialog engine 230 and the entity resolver 240 can be implemented in software, hardware, or a combination of hardware and software.

Dialog engine 230 is configured to manage conversations between a chatbot in the chatbot system 200 and the users

208. In particular, the dialog engine 230 can execute the dialog flow that has been configured for at least one chatbot in the chatbot system 200. In certain embodiments, the dialog engine 230 is a shared component implemented at the digital assistant or system level and manages conversations for all chatbots in the chatbot system 200. However, in other embodiments, one or more chatbots may be configured with their own dialog engine. As part of executing the dialog flow, the dialog engine 230 is configured to access one or more dialog flow definitions 254. As discussed above, each chatbot can have a dialog flow definition configured for it. The dialog engine 230 is configured to execute the dialog flow for any particular conversation by determining, based on the dialog flow definition that applies to the particular conversation (i.e., the dialog flow definition for the chatbot that is participating in the particular conversation), which states to transition to. In this respect, the dialog engine 230 can be viewed as a state machine that receives user input for processing (e.g., user input 202) and produces dialog for output to users (e.g., responses 204).

The dialog engine 230 can invoke components associated with the states that have been configured in a dialog flow definition (e.g., a dialog flow definition 252). For example, as indicated above, the dialog engine 230 can call a System.Intent component that resolves a user intent represented in an utterance to a bot intent that has been configured for a chatbot. Another component that the dialog engine 230 can invoke is the entity resolver 240, which can be called when the dialog engine 230 transitions to a state that references the entity resolver 240. As explained below, the entity resolver 240 can use a composite entity to obtain data items from a user 208 for processing by the dialog engine 230 and/or processing by a chatbot that is configured to make use of the obtained data items. This composite entity can be passed to the entity resolver 240 when invoking the entity resolver 240. For instance, the dialog engine 230 may, based on an identifier of a composite entity included as a part of a reference to the entity resolver 240, communicate the identifier or some other indication 214 of the composite entity 254 to the entity resolver 240.

Entity resolver 240 is configured to parse a composite entity definition 254 that has been configured for the composite entity associated with the indication 214 to determine, from the contents of the composite entity definition 254, what data items are required from a user, what dialog to present to the user in order to request the data items, and whether a data item provided by the user is valid or not. If the data item is invalid, the composite entity definition 254 may indicate to the entity resolver 240 how to proceed with obtaining a valid data item. For instance, the composite entity definition 254 can provide error messages and follow-up prompts for output to the user when the user provides an invalid data item.

The entity resolver 240 can process the composite entity definition 254 in a similar manner to how the dialog engine would process the dialog flow definition 252. For instance, the entity resolver 240 may traverse the composite entity definition 254 (e.g., from top to bottom) to determine the order in which the data items specified in the composite entity definition 254 should be obtained. In some instances, data items can be obtained out of order. For each data item to be obtained, the composite entity definition 254 may include dialog for prompting a user for the data item, dialog for responding when the user supplies an invalid data item, one or more validation rules for determining the validity of a user supplied data item, and/or other configuration information associated with the data item. Thus, each data item specified in the composite entity definition 254 can have at least one rule configured for it. Unlike the dialog flow definition 252, the composite entity definition 254 generally does not include any states to transition between. Instead, the dialog specified in the composite entity definition 254 usually follows a straightforward sequence of prompts and/or messages to the user. In certain embodiments, the dialog in a composite entity definition is arranged as a set of dialog sequences, where each sequence is designed to handle a corresponding data item.

Like the dialog engine 230, the entity resolver 240 can be a digital assistant or system level component. In some embodiments, the entity resolver 240 can be a built-in "System.CommonResponse" or "System.ResolveEntities" component that is accessible to any chatbot in the chatbot system 200. Both of these components can be included in the chatbot system 200 and each may provide functionality besides data item-related processing. For example, the System.CommonResponse component may be configured to generate a user interface for output to a user 208, where the user interface includes text, action buttons (e.g., a button to select a particular option), images (e.g., a carousel of user selectable images representing values), and/or other user interface elements. Thus, the System.CommonResponse component can generate, based on the composite entity definition 254, a user interface designed to guide the user through the process of providing data items specified in the composite entity definition. When the System. ResolveEntities component is used as the entity resolver 240, the System.ResolveEntities component can iterate through the data items specified in composite entity definition 254 and converse with a user 208 to obtain the data items, e.g., using text prompts and action buttons, but through a less feature-rich user interface compared to that which the System.CommonResponse component is capable of generating.

After obtaining data items 216 for the composite entity, the entity resolver 240 can return the data items 216 to the dialog engine 230. The dialog engine 230 can process the data items 216 as part of executing the dialog flow specified in the dialog flow definition 252. Since the dialog flow definition 252 is a model for the conversation between the chatbot and the user, the processing of the data items 216 by the dialog engine can be considered to be processing performed by the chatbot itself. Further, there may be some instances in which the chatbot performs some processing on the data items 216 separately from any processing of the data items 216 performed as part of executing the dialog flow. In such instances, the data items 216 can be passed from the dialog engine 230 to the chatbot. In certain embodiments, a composite entity is configured for use in connection with a particular bot intent and may group together related data items that are applicable to that particular bot intent. For example, for a pizza ordering bot configured with an OrderPizza intent, a composite entity used in connection with the OrderPizza intent could contain values for the "PizzaSize," "PizzaToppings," and "PizzaType" entities. Thus, the dialog flow definition 252 and the composite entity definition 254 could both be stored (e.g., in a data store 250) in association with a particular chatbot in the chatbot system 200. Grouping related data items together in the same composite entity provides a way to efficiently obtain all user-provided data items that are needed for processing by a particular chatbot or a particular intent configured for the chatbot.

Figure 3:
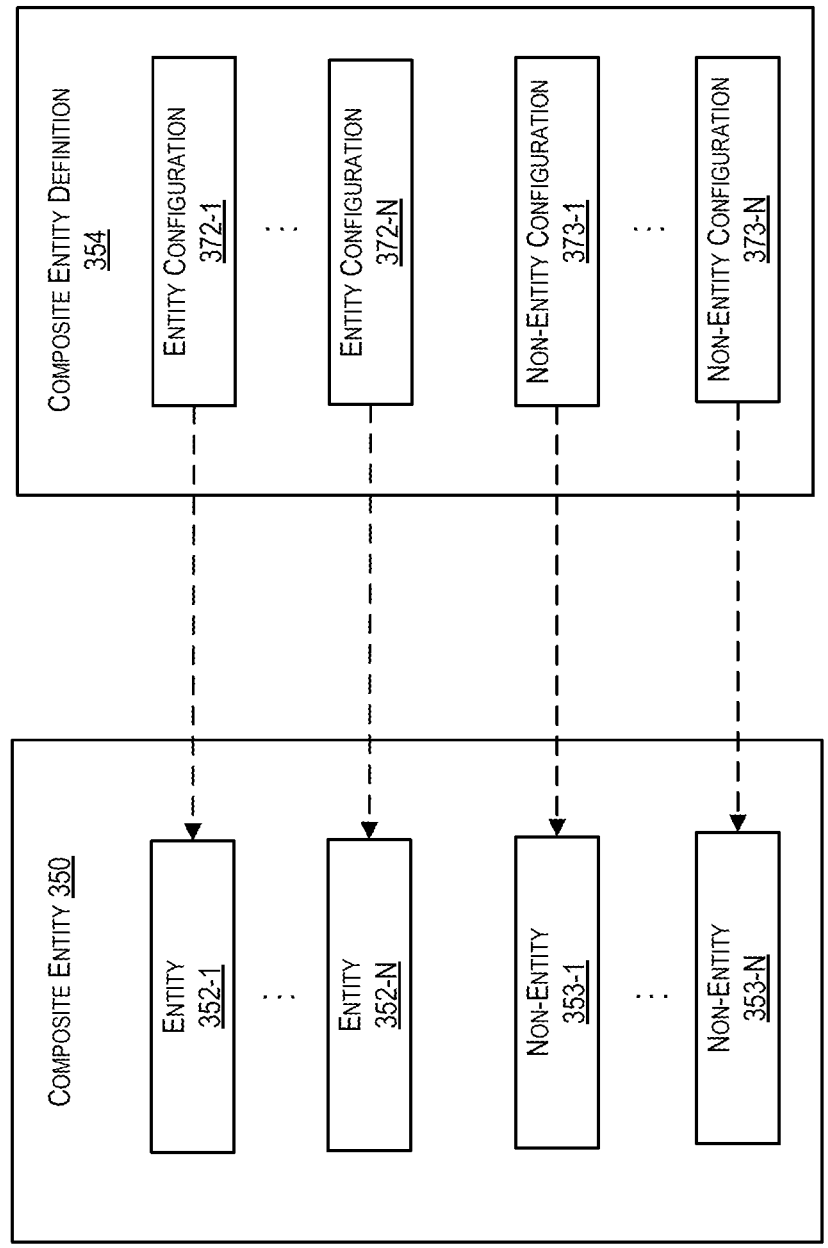
FIG. 3 is a simplified block diagram of a composite entity according to certain embodiments.

FIG. 3 is a simplified block diagram of a composite entity 300 according to certain embodiments. The composite entity 300 can be instantiated when a corresponding composite entity definition 354 is accessed by an entity resolver (e.g., entity resolver 230 in FIG. 2). The composite entity 300 can be maintained as a data structure within a memory of the chatbot system 300 (e.g., in database 250). A composite entity definition, such as the composite entity definition 354, can be custom created by a chatbot developer from scratch. Alternatively, in certain embodiments, one or more composite entities may be provided as built-in entities that are made available for use as-is or for customization if a chatbot developer so desires.

A composite entity can be view as a container or bag that has slots for holding a set of data items. For example, as depicted in FIG. 3, the composite entity 300 can include multiple entities 352. Each entity 352 can be, for example, a variable that has one or more values associated with it. For example, as indicated above, a pizza ordering bot may be configured to use "PizzaToppings" and "PizzaSize" entities. A user may be permitted to specify multiple types of toppings for the Pizza Toppings entity (e.g., "pepperoni," "mushroom," "olives," "sausage," or any combination thereof), whereas the user may be limited to specifying a single value for the "PizzaSize" entity (e.g., "small," "medium," or "large"). Thus, the values for an entity 352 can be stored as a single value or a multi-value array.

In certain embodiments, a composite entity can also be configured to hold non-entities (e.g., non-entities 353). A non-entity can be a data item that does not have a predefined set of valid values configured for it or a data item that does not have a fixed format. A non-entity can nonetheless be obtained by an entity resolver in a similar manner to values for entities. Examples of non-entities include strings (e.g., a free-text explanation for why a user cannot provide a receipt for an expense report), locations (e.g., a location captured by a GPS sensor on a device that a user is using to communicate with a chatbot system), and documents or other file attachments (e.g., an image of a receipt). Additionally, in some embodiments, a composite entity can be a nested entity that holds another composite entity.

As shown in FIG. 3, for each entity 352 and non-entity 353, a corresponding configuration (372 and 373, respectively) is specified in the composite entity definition 354 that defines the composite entity 300. Each configuration 372, 373 can specify whether the corresponding entity or non-entity is required or optional, one or more rules for determining what values or other parameters associated with a data item are considered valid, how a user should be prompted for a corresponding data item, as well other configuration parameters that determine the way in which the slots within the composite entity 300 are filled by an entity resolver. For example, the configurations 372, 373 may provide, for each of their corresponding data items (i.e., entities 352 and non-entities 353), a logical sequence of prompts, questions, statements, and the like, that elicit the data items from the user.

Accordingly, when the functionality provided by the composite entity definition 354 is taken into consideration, the composite entity 300 is not just a container for different data items, but also a way to implement logic for controlling the manner in which the data items are obtained from a user. For example, whether or not an entity resolver needs to obtain the value of an entity 352 can be based on one or more conditions specified as part of the entity configuration 372 for the entity. The conditions can relate to actions that the user wants to perform, a particular response the user has provided, the state or value of an entity not part of the composite entity, the state or value of an entity that is part of the composite entity (e.g., obtain entity A only if entity B is first obtained, or obtain entity A only if entity B is greater than a certain value, where entities A and B are part of the same composite entity), information obtained from a computer system communicatively coupled to the chatbot system (e.g., a server of a financial institution), the dialog flow state that led to the entity resolver being invoked, and the like.

As an example of the use of conditions for obtaining data items, a composite entity for the OrderPizza intent could be configured with a rule that causes the entity resolver to ask whether the user wants pineapple (a type of topping) if and only if the user has requested a Hawaiian pizza (a type of pizza that has pineapple by default). Thus, a composite entity definition can specify both what slots to fill and how to fill the slots.

Example User Interface for Configuring a Composite Entity Definition

In certain embodiments, a user interface is provided that enables a chatbot developer to create and configure a composite entity definition without doing any explicit programming. The user interface may be provided, for example, by a DABP such as the DABP 102 in FIG. 1. An example of such an interface is shown in FIG. 4.

Figure 4:
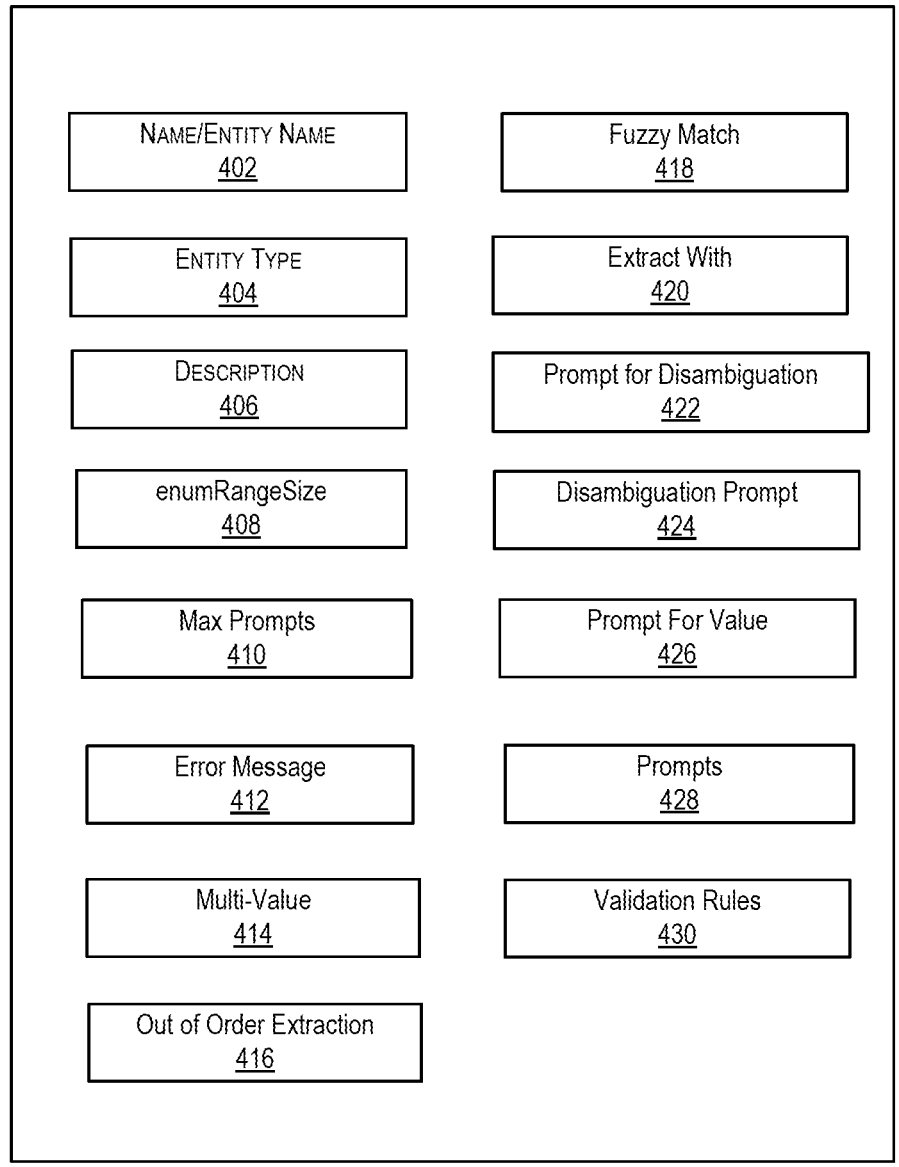
FIG. 4 illustrates an example user interface for configuring a composite entity definition according to certain embodiments.

FIG. 4 illustrates an example user interface 400 for configuring a composite entity definition according to certain embodiments. In the context of FIG. 4, a user is a person using the user interface 400 to configure a composite entity (e.g., a chatbot developer), and an end-user is a person providing data items to fill the slots of the composite entity (e.g., a user 208 in FIG. 2). Further, in the context of FIG. 4, an entity defined using the user interface 400 can refer to any of the data items described herein (e.g., the entities 352 and non-entities 353 in FIG. 3). The user interface 400 can be presented after the user has indicated all the data items to be contained within a composite entity. A separate user interface (not depicted) can be provided for indicating the data items.

The user interface 400 include various options 402 to 430, each option associated with a particular property of a data item. Configuration performed using the options 402 to 430 may result in one or more rules being created for each data item contained within the composite entity. Such rules can be expressed in different ways, for example, as logical expressions that include Boolean terms, AND/OR statements, IF-ELSE statements, and the like. Although depicted together, the options 402 to 430 can be presented separately, and each option may be associated with its own set of user interface elements (e.g., sub-menus, drop-down lists, text entry fields, etc.) that are not shown in FIG. 4. Therefore, it will be understood that the embodiment depicted in FIG. 4 is merely an example intended to illustrate different configuration options that can be made available through a user interface. Options 402 to 430 are described below in reference to the text labels depicted for these options in FIG. 4.

Name/Entity Name (402)—Allows the user to specify a name by which a data item is identified (e.g., "PizzaType"). In certain embodiments, the user can create a "Name" that uniquely identifies the data item within the composite entity and a separate "Entity Name" by which the data item is identified outside the composite entity. For example the Entity Name can be the name of a system level (e.g., built-in) entity or a custom entity. Using both Name and Entity Name allows the same system level or custom entity to be reused multiple times within the composite entity. For instance, multiple entities can be defined that each correspond to a built-in Yes_No entity in order to capture yes/no answers to different questions.

Entity Type (404)—Allows the user to specify the type of data item. Examples of data item types that can be supported include: Entity, String, Attachment, and Location. The last three are examples of non-entities described above in connection with FIG. 3.

Description (406)—Allows the user to provide a short description of the data item.

enumRangeSize (408)—Allows the user to specify how many values are displayed to an end-user (e.g., in connection with requesting confirmation that the end-user entered the values correctly). If the range size is smaller than the total number of values to be listed, "show more" and "shown previous" buttons can be generated to navigate through the values in the list. The range size can also be used to determine how many disambiguation options are presented to the end-user (e.g., when the end-user provides multiple valid values, but only the data item only supports one value).

Max Prompts (410)—Allows the user to specify a value for the maximum number of times the end-user is prompted for a valid data item after supplying an invalid data item. If this value is exceeded, then the entity resolver can terminate the process of obtaining data items for the composite entity or, alternatively, continue on to the next data item in the composite entity.

Error Message (412)—Allows the user to specify an error message to present to the end-user when the end-user is prompted for a data item and provides an invalid data item. In some embodiments, the error message is not presented if the data item provided by the end-user is valid for a different item in the composite entity (e.g., the end-user is prompted for pizza toppings, but responds by indicating the pizza size instead).

Multi-Value (414)—Allows the user to specify whether the data item supports multiple values. For example, as discussed above, multiple types of toppings can be specified for the PizzaToppings entity (e.g., "pepperoni," "mushroom," "olives," "sausage," or any combination thereof).

Out of Order Extraction (416)—Allows the user to specify whether the data item can be resolved while the end-user is prompted for a different data item in the composite entity. When out of order extraction is enabled, slots can be filled in a different order than that which is defined in the composite entity definition. Out of order extraction also permits a slot to be filled without the end-user being prompted to provide the data item used to fill the slot (e.g., the end-user is prompted for account type, but the end-user provides the amount of money to transfer either in addition to, or instead of, providing the account type). Together with the Extract With option 420 and the Prompt for Value option 426 described below, the Out of Order Extraction option 416 can be used to create one or more extraction rules that determine slot filling behavior.

Fuzzy Match (418)—Allows the user to specify whether fuzzy matching against an entity value list is used. When fuzzy matching is enabled, the entity resolver can match the end-user input to the closest valid value. This provides an allowance for inexact matches (e.g., when the end-user inputs a value with a typographical error or uses a synonym for a valid value).

Extract With (420)—Allows the user to specify that the data item should be obtained in conjunction with another data item in the composite entity. The Extract With option is useful for when an end-user's reply could potentially be one of multiple alternative data items. For example, when prompting the end-user for a receipt as evidence of an expense, the end-user's response to the prompt could be to upload an image of the receipt or state that the end-user does not have a receipt (e.g., the receipt was lost). To capture both possible scenarios, a composite entity for an expense bot may include a "ReceiptNotFound" entity that is extracted with a "Receipt" entity, where the ReceiptNotFound entity is used to capture a value of "noReceipt" in the event that the user does not have a receipt. Since "ReceiptNotFound" is extracted with "Receipt," this means that the value of the "ReceiptNotFound" entity is filled as a result of asking the user for the value of the "Receipt" entity instead of separately prompting for the value of "ReceiptNotFound.". When the entity resolver tries to obtain the Receipt entity, but the end-user responds that he or she does not have a receipt, then and only then will the entity resolver try to obtain the ReceiptNotFound entity. If the end-user's response is a match to the "noReceipt" value, then the end-user will not be prompted again for the "Receipt" entity, and the entity resolver will move on to the next data item.

Prompt for Disambiguation (422)—Allows the user to specify whether the end-user will be prompted to choose which value to use when the end-user has provided multiple values that are valid for an entity.

Disambiguation Prompt (424)—Allows the user to specify a custom prompt that will be presented to the end-user in connection with asking the end-user to choose between multiple values that are valid for an entity. For example, the custom prompt could be: "You can only order one pizza at a time. Which pizza would you like to order?" If no custom prompt is configured, a default prompt can be presented (e.g., "Please select one value for <item name>"). In some embodiments, disambiguation can be performed automatically by calling a custom component that resolves the ambiguity without prompting the user. This provides chatbot developers with the flexibility to programmatically create their own logic for disambiguation should they wish to do so.

Prompt for Value (426)—Allows the user to set a property that controls whether the end-user will be prompted to provide a value for a data item, thus indicating whether the data item is optional or not. The property can be set as a Boolean flag that evaluates to "true" or "false." This allows for conditional prompting for an entity based on other entity values in the composite entity and/or based on other context or user variables. Thus, the Prompt for Value option 426 can be used to create a logical expression that indicates one or more conditions that trigger a prompt (e.g., prompt for the value of data item A only if the value of data item B is greater than a certain amount, prompt for the value of data item C only if the end-user logged in within the past week, and so on).

In the no receipt example described above in connection with the Extract With option 420, the composite entity could further include a "ReasonNoReceipt" string for capturing an explanation as to why the end-user does not have a receipt. The entity resolver may prompt the end-user to input the explanation, based on an extraction rule created for the ReasonNoReceipt string using the Prompt for Value option 426. For example, the extraction rule may cause the entity resolver to prompt the end-user to provide an explanation when both of the following conditions are met: (1) the expense amount is greater than $25 and (2) a valid value (e.g., "noReceipt") has been obtained for the ReceiptNotFound entity. This rule could be represented as a logical expression:

"$(expense.value.Amount.amount >25 && expense.value.ReceiptNotFound? has_content)."

Prompts (428)—Allows the user to specify a list of different prompts that can be presented to the end-user in connection with obtaining a data item. In certain embodiments, the user is permitted to configure the list as an ordered sequence, where each prompt in the list is assigned a different order. In this manner, the user can control the output order of the prompts. The order may be configured so that data items are requested in an order that the end-user would expect based on the task to be perform by the chatbot. For example, the sequence of prompts for the PizzaType entity within a composite entity that holds data items relating to the OrderPizza intent could be as follows:

1. What kind of pizza would you like to order?
2. What size pizza do you want?
3. Pizza sizes are like large, medium, small, etc. Which one would you like?

Prompt sequences can also be used to present increasing detailed prompts to the end-user if the end-user's responses are insufficient for resolving an ambiguity.

Validation Rules (430)—Allows the user to specify rules for determining whether a data item supplied by an end-user is valid (e.g., a valid range of numerical values, valid sizes for pizzas, etc.). For example, a validation rule may be defined to disallow expense amounts of less than $5 for expense reports. Similar to extraction rules, validation rules can be defined as logical expressions, e.g., "$(expense.value.Amount.amount >4)." In some embodiments, validation rules defined programmatically, thus giving the user the flexibility of programming their own validation rules in addition or as an alternative to creating validation rules using the user interface 400.

The composite entity can be configured with error messages to present to the end-user when a data item is determined to be invalid. The error messages can be generated based on logical expressions, e.g., "$(expense.value.Amount.currency) cannot be expensed. Enter a higher amount or type 'cancel.'"

In addition to the options 402 to 430 described above, the user interface 400 can include other options for configuring the slot filling behavior for the composite entity. For example, in certain embodiments, a "transitionAfterMatch" option is provided which permits a transition (e.g., from a state referencing the entity resolver) to a different state after the entity resolver receives a valid data item. For instance, when the end-user provides a data item that is determined to be valid (e.g., based on matching the data item to a list of valid values configured for the data item or based on a validation rule), a transition can be made to a state associated with a custom component.

Transitioning to the state associated with the custom component enables the dialog flow execution to temporarily leave the entity resolver to do some custom logic in the custom component (e.g., downstream processing of an end-user supplied value that the entity resolver determined to be valid), and then return to the entity resolver to resume filling the composite entity. Example use cases for transitioning to a different state include:

After a receipt has been uploaded as an attachment-type data item for an "Expense" composite entity, scanning the receipt to extract information used to fill other data items in the Expense composite entity (e.g., expense date, amount, expense type, etc.). This could be used to reduce the workload of the entity resolver, as there would no longer be a need to prompt the end-user for this information.

After a certain number of entities in a composite entity have been resolved as a result of valid data items being provided for those entities, outputting a "nicety" message such as "Almost there, just two more questions!"

When a data item needs to be validated through some backend processing (e.g., via an application-program interface (API) call to a software application) and one of the following is true: (1) the validation of the data item cannot wait because the API call returns information that dictates which other data items in the composite entity need to be prompted for, or (2) the API call returns some information that must be shared with the end-user.

Example Method

Figure 5:
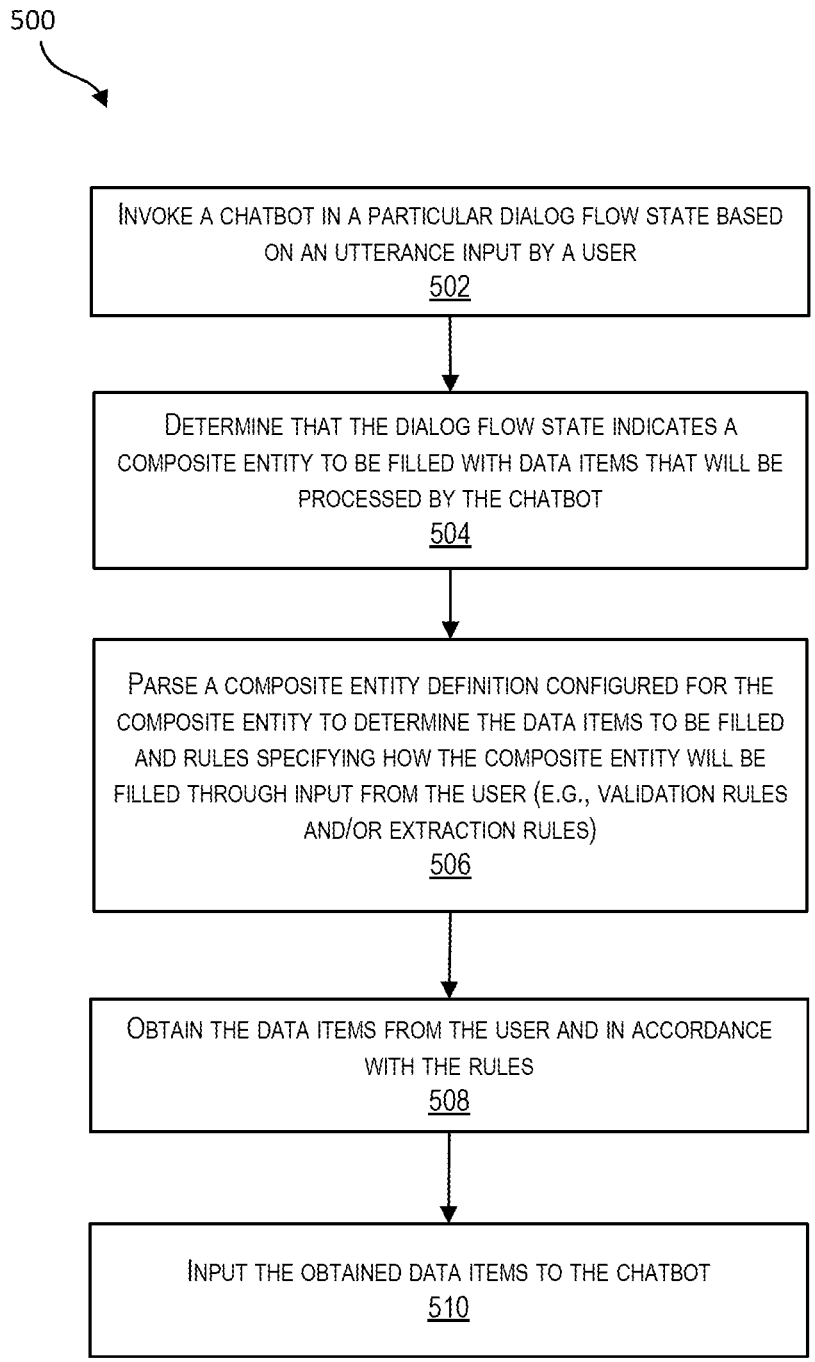
FIG. 5 is a flowchart illustrating an example process for obtaining data items using a composite entity according to certain embodiments.

FIG. 5 is a flowchart illustrating a process for obtaining data items using a composite entity according to certain embodiments. The processing depicted in FIG. 5 may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 5 and described below is intended to be illustrative and non-limiting. Although FIG. 5 depicts the various processing steps occurring in a particular sequence or order, this is not intended to be limiting. In certain alternative embodiments, the processing may be performed in some different order or some steps may also be performed in parallel. In certain embodiments, the processing depicted in FIG. 5 is performed by a chatbot system that includes an entity resolver (e.g., the entity resolver 230 in FIG. 2).

At 502, a chatbot is invoked in a particular dialog flow state based on an utterance input by a user of the chatbot system. For example, the chatbot could be a skill bot in a digital assistant and may be invoked in a default starting state or a state associated with a particular intent that has been configured for the skill bot. As discussed above, the dialog flow definition for a chatbot can be configured with different dialog flow states associated with different intents, where the intents represent tasks that the chatbot is capable of performing. Depending on what was specified in the utterance, the chatbot could be invoked in any number of possible dialog flow states. Each of the states in the dialog flow definition can reference a particular component (e.g., a built-in or custom component) that performs a certain function or action. In some instances, the invoking in 502 occurs prior to starting a conversation between the chatbot and the user. In other instances, the invoking occurs during an existing conversation between the chatbot and the user, in which case the invoking may involve a transition from one dialog flow state configured for the chatbot to another dialog flow state configured for the chatbot.

At 504, a determination is made that the dialog flow state in which the chatbot was invoked in 502 indicates a composite entity to be filled with data items that will be processed by the chatbot. For example, as indicated above, the composite entity may be a container for a set of data items (e.g., variables that hold certain values, strings, location data such as GPS coordinates, file attachments, or a combination thereof). If the chatbot was invoked in a dialog flow state associated with a particular intent, then at least some of the data items to be filled may be data items that are processed in connection with performing the task represented by the particular intent (e.g., "PizzaType" and "PizzaSize" entities for an OrderPizza intent).

At 506, a composite entity definition configured for the composite entity is parsed (e.g., by an entity resolver), to determine the data items to be filled and rules specifying how the composite entity will be filled through input from the user. For example, as discussed above, a composite entity can be configured with validation rules and/or extraction rules. Validation rules can specify conditions for when a data item (e.g., a value provided by a user for a particular entity) is considered valid. Extraction rules can specify the manner in which a user is prompted for data items (e.g., what text prompts to present to the user, the order in which text prompts are presented, whether a data item is to be obtained in conjunction with another data item, error messages to present when the user provides an invalid, whether a data item can be resolved while the end-user is prompted for a different data item in the composite entity, and conditions for when the user is prompted for a particular data item). Accordingly, there can be at least one rule configured for each data item in the composite entity.

At 508, the data items are obtained from the user and in accordance with the rules determined in 506. It should be noted that the rules do not have to be determined all at once. Instead, the entity resolver may evaluate rules on a per data item basis by obtaining a data item specified in the composite entity definition (through one or more prompts configured for the data item, evaluating the validity of the data item, etc.), and then progressing to the next data item in the composite entity definition.

At 510, the data items obtained in 508 are input to the chatbot that was invoked in 502. To input the data items, the chatbot system or entity resolver may include the composite entity in a message sent to the chatbot. In some embodiments, the entire contents of the composite entity are included in a body of the message. In other embodiments, the contents of the composite entity are written to a data store accessible to the chatbot and then a pointer to the location of the composite entity in the data store is communicated to the chatbot. After the data items have been input to the chatbot, the data items may be processed by another component called from the chatbot (e.g., a different component that is indicated in dialog flow state in which the chatbot was invoked). This other component may perform some downstream processing using the obtained data items, based on which the chatbot may determine an action to perform or a response to send to the user.

Additionally, in some instances, the state in which the chatbot was invoked may indicate multiple composite entities. In such instances, the processing in blocks 506 to 510 can be repeated for each additional composite entity. When there are multiple composite entities, the data obtained for the composite entities can be input over the course of a single communication (e.g., a single message sent to the chatbot with all the data items for the various composite entities) or over multiple communications (e.g., a separate message for each composite entity).

Example Composite Entity Definition

The following is an example composite entity definition for a composite entity named "Expense." In this example, the composite entity is configured to hold the following data items:

Type—the type of expense report that a user is creating.
Amount—the amount of the expense being reported.
UseCanadianDollars—a Boolean entity indicating whether the expense is being reported in Canadian dollars.
ReasonMaxAmountExceeded—a string to capture the reason why a maximum allowable amount (in this example, $2,000) is exceeded.
Date—the date on which the expense was incurred.
Receipt—a file attachment corresponding to an expense receipt.
ReceiptNotFound—an entity that is set when no receipt is found.
ReasonNoReceipt—a string to capture the reason why the user cannot provide a receipt.
Confirmed—a Boolean entity set based on prompting the user to confirm that the information provided by the user for creating the expense report is accurate and complete.
AnythingElse—a Boolean entity set based on asking the user whether the user wants to make a change to the information already provided by the user. This entity is prompted for when the value of the Confirmed entity is set to "No."

```
name: "Expense"
type: "COMPOSITEBAG"
    compositeBagItems:
    name: "Type"
        type: "ENTITY"
        entityName: "ExpenseType"
        description: "the type"
        errorMessage: "'${system.entityToResolve.value.userInput!'This'}' is not a valid expense type. "
        multiValue: false
        fuzzyMatch: false
        outOfOrderExtraction: true
        promptForDisambiguation: true
        disambiguationPrompt: "You can only expense one item at the time, choose which one you want to start with"
        maxPrompts: 3
        enumRangeSize: 3
        prompts:
        text: "What type of expense would you like to create?"
        text: "Can you give me the expense type?"
    name: "Amount"
        entityName: "CURRENCY"
        type: "ENTITY"
        description: "the amount"
        errorMessage: "Sorry, '${system.entityToResolve.value.userInput!'this'}' is not a valid amount. "
        maxPrompts: 2
        promptForDisambiguation: true
```

```
            disambiguationPrompt: "You have to provide one exact amount."
            outOfOrderExtraction: true
            prompts:
            sequenceNr: 1
                text: "How much did you pay?"
            sequenceNr: 2
                text: "Please specify the expense amount and currency. For example '$30' or '20 euros'"
            validationRules:
            expression: "${expense.value.Amount.amount > 4}"
                errorMessage: "Amounts below 5 ${expense.value.Amount.currency} cannot be
expensed. Enter a higher amount or type 'cancel'."
        name: "UseCanadianDollars"
            type: "ENTITY"
            entityName: "YES_NO"
            description: "use Canadian dollars"
            errorMessage: "Sorry, I didn't get that, please answer with 'yes' or 'no'"
            outOfOrderExtraction: false
            promptForValue: "${expense.value.Amount.currency=='dollar' &&
lastExpense.value?has_content && lastExpense.value.Amount.currency=='cad'}"
            prompts:
            text: "Do you still want to use Canadian dollars?"
        name: "ReasonMaxAmountExceeded"
            type: "STRING"
            description: "the reason max amount exceeded"
            outOfOrderExtraction: false
            promptForValue: "${expense.value.Amount.amont > 2000}"
            prompts:
            text: "You need to give a justification for any transaction above 2000 USD. Please enter a
reason to add to this expense."
        name: "Date"
            type: "ENTITY"
            entityName: "DATE"
            description: "the expense date"
            errorMessage: "${system.entityToResolve.value.userInput!'This'} is not a valid date. "
            promptForDisambiguation: true
            disambiguationPrompt: "I found multiple dates: <#list
system.entityToResolve.value.disambiguationValues.Date as
date>${date.date?number_to_date}<#sep> and </#list>. Which date should I use as expense
date?"
            outOfOrderExtraction: false
            prompts:
            sequenceNr: 1
                text: "When did that expense occur?"
            sequenceNr: 2
                text: "Can you provide a valid expense date? For example 'yesterday', 'jul 2' or '20 jun'"
            validationRules:
            expression: "${(.now?date?string['yyyyMMdd']?number >=
expense.value.Date.date?number_to_date?string['yyyyMMdd']?number)?then('true','false')}"
                errorMessage: "Expense data cannot be in the future, you can use today or a date in the
past."
        name: "Receipt"
            type: "ATTACHMENT"
            description: "the receipt"
            outOfOrderExtraction: false
            promptForValue: "${expense.value.Amount.amount > 25 &&
!expense.value.ReceiptNotFound?has_content}"
            prompts:
            text: "A receipt is needed for expenses above 25$. If you have a digital version of the
receipt, you can attach it. If you have a printed version, you can take a picture and attach it.'"
        name: "ReceiptNotFound"
            type: "ENTITY"
            entityName: "ReceiptNotFound"
            outOfOrderExtraction: false
            extractWith: "Receipt"
            promptForValue: "false"
        name: "ReasonNoReceipt"
            type: "STRING"
            outOfOrderExtraction: false
            promptForValue: "${expense.value.Amount.amount > 25 &&
expense.value.ReceiptNotFound?has_content}"
            prompts:
            text: "You need to give a justification why you don't have the receipt"
        name: "Confirmed"
            type: "ENTITY"
            entityName: "YES_NO"
            description: "confirmed"
            outOfOrderExtraction: false
```

```
    prompts:
        text: "I have all information needed to create your expense. Just to verify my
understanding: you want to expense a ${expense.value.Type} for
${expense.value.Amount.amount} ${expense.value.Amount.currency} on
${expense.value.Date.date?number_to_date}. Is that correct?'"
    name: "AnythingElse"
        type: "ENTITY"
        entityName: "YES_NO"
        description: "anything else"
        promptForValue: "${expense.value.Confirmed.yesno=='NO'}"
        outOfOrderExtraction: false
        prompts:
            text: "${(system.entityToResolve.value.updatedEntities?size!=0)?then('Anything else
you want to change?','What do you want to change?')}"
```

Example Computing Environments for
Implementing a Chatbot System

Figure 6:
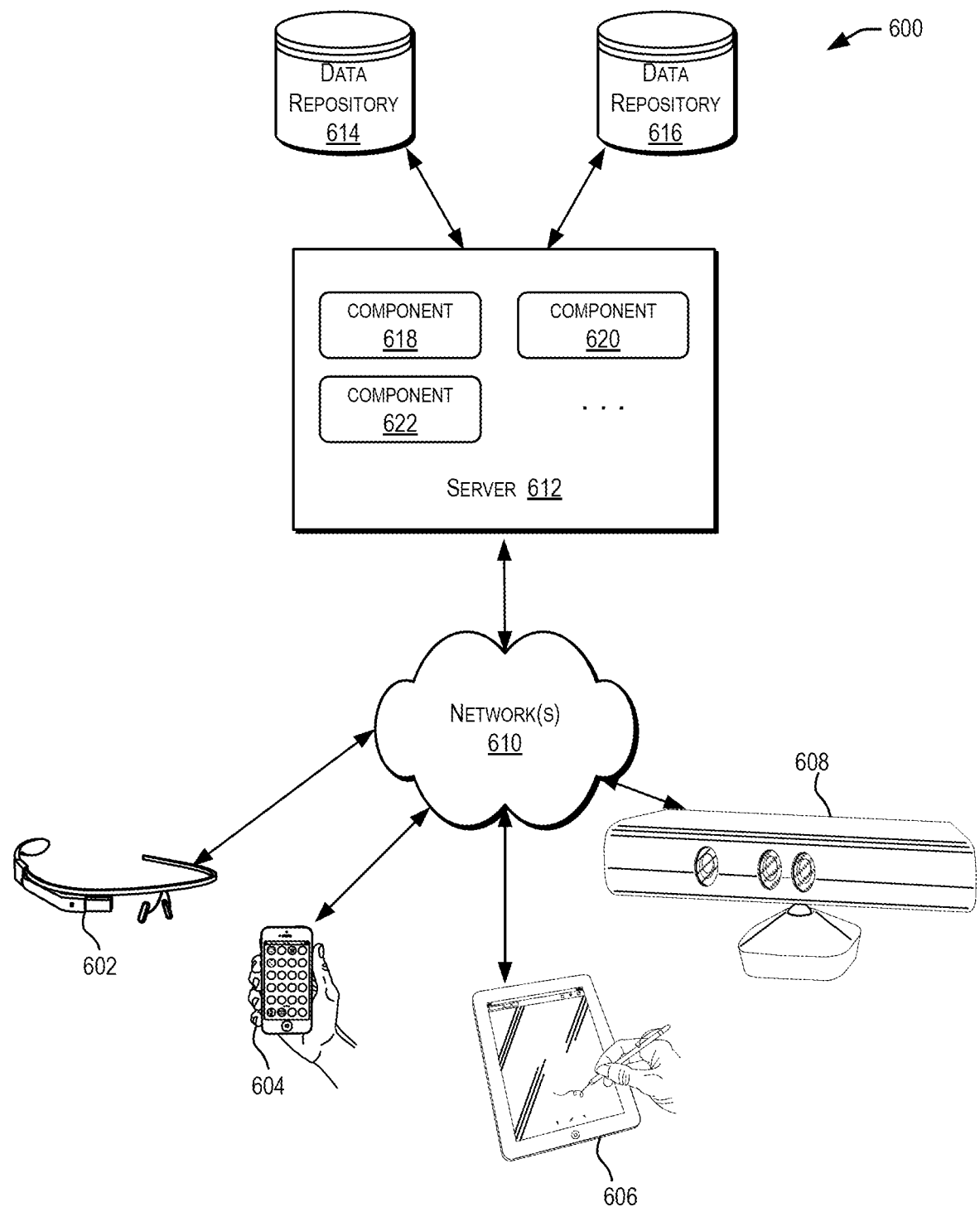
FIG. 6 depicts a simplified diagram of a distributed system for implementing an embodiment.

FIG. 6 depicts a simplified diagram of a distributed system 600 for implementing an embodiment. In the illustrated embodiment, distributed system 600 includes one or more client computing devices 602, 604, 606, and 608, coupled to a server 612 via one or more communication networks 610. Clients computing devices 602, 604, 606, and 608 may be configured to execute one or more applications.

In various embodiments, server 612 may be adapted to run one or more services or software applications that enable the composite entity related processing described in this disclosure.

In certain embodiments, server 612 may also provide other services or software applications that can include non-virtual and virtual environments. In some embodiments, these services may be offered as web-based or cloud services, such as under a Software as a Service (SaaS) model to the users of client computing devices 602, 604, 606, and/or 608. Users operating client computing devices 602, 604, 606, and/or 608 may in turn utilize one or more client applications to interact with server 612 to utilize the services provided by these components.

In the configuration depicted in FIG. 6, server 612 may include one or more components 618, 620 and 622 that implement the functions performed by server 612. These components may include software components that may be executed by one or more processors, hardware components, or combinations thereof. It should be appreciated that various different system configurations are possible, which may be different from distributed system 600. The embodiment shown in FIG. 6 is thus one example of a distributed system for implementing an embodiment system and is not intended to be limiting.

Users may use client computing devices 602, 604, 606, and/or 608 to more configure a composite entity definition, configure a dialog flow definition for a chatbot, and engage in conversation with a chatbot system to provide data items for filling a composite entity, in accordance with the teachings of this disclosure. A client device may provide an interface that enables a user of the client device to interact with the client device. The client device may also output information to the user via this interface. Although FIG. 6 depicts only four client computing devices, any number of client computing devices may be supported.

The client devices may include various types of computing systems such as portable handheld devices, general purpose computers such as personal computers and laptops, workstation computers, wearable devices, gaming systems, thin clients, various messaging devices, sensors or other sensing devices, and the like. These computing devices may run various types and versions of software applications and operating systems (e.g., Microsoft Windows®, Apple Macintosh®, UNIX® or UNIX-like operating systems, Linux or Linux-like operating systems such as Google Chrome™ OS) including various mobile operating systems (e.g., Microsoft Windows Mobile®, iOS®, Windows Phone®, Android™, BlackBerry®, Palm OS®). Portable handheld devices may include cellular phones, smartphones, (e.g., an iPhone®), tablets (e.g., iPad®), personal digital assistants (PDAs), and the like. Wearable devices may include Google Glass® head mounted display, and other devices. Gaming systems may include various handheld gaming devices, Internet-enabled gaming devices (e.g., a Microsoft Xbox®) gaming console with or without a Kinect® gesture input device, Sony PlayStation® system, various gaming systems provided by Nintendo®, and others), and the like. The client devices may be capable of executing various different applications such as various Internet-related apps, communication applications (e.g., E-mail applications, short message service (SMS) applications) and may use various communication protocols.

Network(s) 610 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk®, and the like. Merely by way of example, network(s) 610 can be a local area network (LAN), networks based on Ethernet, Token-Ring, a wide-area network (WAN), the Internet, a virtual network, a virtual private network (VPN), an intranet, an extranet, a public switched telephone network (PSTN), an infra-red network, a wireless network (e.g., a network operating under any of the IEEE 802.11 suite of protocols, Bluetooth®, and/or any other wireless protocol), and/or any combination of these and/or other networks.

Server 612 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 612 can include one or more virtual machines running virtual operating systems, or other computing architectures involving virtualization such as one or more flexible pools of logical storage devices that can be virtualized to maintain virtual storage devices for the server. In various embodiments, server 612 may be adapted to run one or more services or software applications that provide the functionality described in the foregoing disclosure.

The computing systems in server 612 may run one or more operating systems including any of those discussed above, as well as any commercially available server operating system. Server 612 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle®, Microsoft®, Sybase®, IBM® (International Business Machines), and the like.

In some implementations, server 612 may include one or more applications to analyze and consolidate data feeds and/or event updates received from users of client computing devices 602, 604, 606, and 608. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 612 may also include one or more applications to display the data feeds and/or real-time events via one or more display devices of client computing devices 602, 604, 606, and 608.

Distributed system 600 may also include one or more data repositories 614, 616. These data repositories may be used to store data and other information in certain embodiments. For example, one or more of the data repositories 614, 616 may be used to store dialog flow definitions, composite entities, composite entity definitions, and/or other information used to provide the composite entity related functionalities described above. Data repositories 614, 616 may reside in a variety of locations. For example, a data repository used by server 612 may be local to server 612 or may be remote from server 612 and in communication with server 612 via a network-based or dedicated connection. Data repositories 614, 616 may be of different types. In certain embodiments, a data repository used by server 612 may be a database, for example, a relational database, such as databases provided by Oracle Corporation® and other vendors. One or more of these databases may be adapted to enable storage, update, and retrieval of data to and from the database in response to SQL-formatted commands.

In certain embodiments, one or more of data repositories 614, 616 may also be used by applications to store application data. The data repositories used by applications may be of different types such as, for example, a key-value store repository, an object store repository, or a general storage repository supported by a file system.

Figure 7:
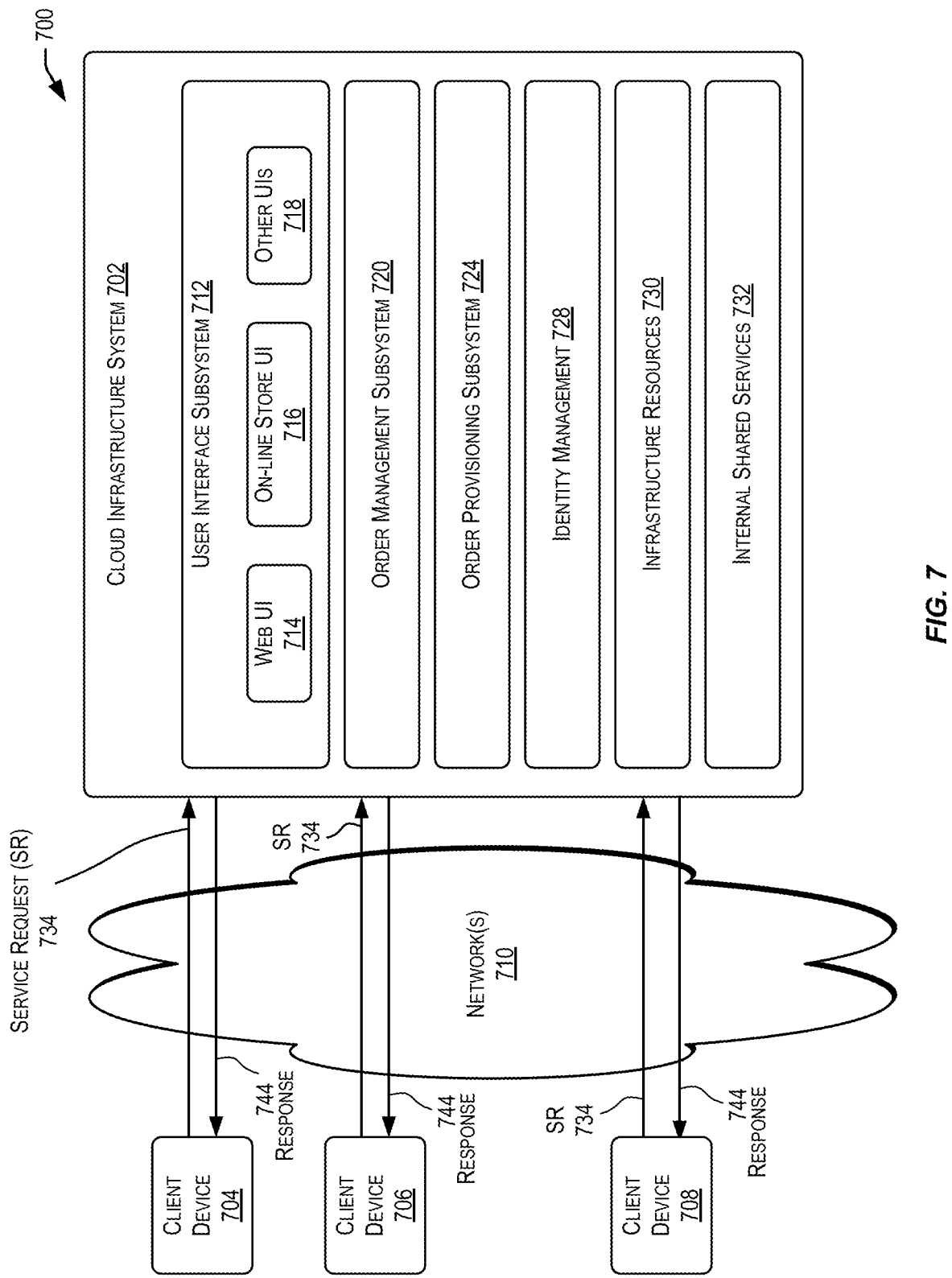
FIG. 7 is a simplified block diagram of a cloud-based system environment in which various chatbot-related services may be offered as cloud services, in accordance with certain embodiments.

In certain embodiments, the composite entity related functionalities described in this disclosure may be offered as services via a cloud environment. FIG. 7 is a simplified block diagram of a cloud-based system environment in which various chatbot-related services, including composite entity related services, may be offered as cloud services, in accordance with certain embodiments. In the embodiment depicted in FIG. 7, cloud infrastructure system 702 may provide one or more cloud services that may be requested by users using one or more client computing devices 704, 706, and 708. Cloud infrastructure system 702 may comprise one or more computers and/or servers that may include those described above for server 612. The computers in cloud infrastructure system 702 may be organized as general purpose computers, specialized server computers, server farms, server clusters, or any other appropriate arrangement and/or combination.

Network(s) 710 may facilitate communication and exchange of data between clients 704, 706, and 708 and cloud infrastructure system 702. Network(s) 710 may include one or more networks. The networks may be of the same or different types. Network(s) 710 may support one or more communication protocols, including wired and/or wireless protocols, for facilitating the communications.

The embodiment depicted in FIG. 7 is only one example of a cloud infrastructure system and is not intended to be limiting. It should be appreciated that, in some other embodiments, cloud infrastructure system 702 may have more or fewer components than those depicted in FIG. 7, may combine two or more components, or may have a different configuration or arrangement of components. For example, although FIG. 7 depicts three client computing devices, any number of client computing devices may be supported in alternative embodiments.

The term cloud service is generally used to refer to a service that is made available to users on demand and via a communication network such as the Internet by systems (e.g., cloud infrastructure system 702) of a service provider. Typically, in a public cloud environment, servers and systems that make up the cloud service provider's system are different from the customer's own on-premise servers and systems. The cloud service provider's systems are managed by the cloud service provider. Customers can thus avail themselves of cloud services provided by a cloud service provider without having to purchase separate licenses, support, or hardware and software resources for the services. For example, a cloud service provider's system may host an application, and a user may, via the Internet, on demand, order and use the application without the user having to buy infrastructure resources for executing the application. Cloud services are designed to provide easy, scalable access to applications, resources and services. Several providers offer cloud services. For example, several cloud services are offered by Oracle Corporation® of Redwood Shores, California, such as middleware services, database services, Java cloud services, and others.

In certain embodiments, cloud infrastructure system 702 may provide one or more cloud services using different models such as under a Software as a Service (SaaS) model, a Platform as a Service (PaaS) model, an Infrastructure as a Service (IaaS) model, and others, including hybrid service models. Cloud infrastructure system 702 may include a suite of applications, middleware, databases, and other resources that enable provision of the various cloud services.

A SaaS model enables an application or software to be delivered to a customer over a communication network like the Internet, as a service, without the customer having to buy the hardware or software for the underlying application. For example, a SaaS model may be used to provide customers access to on-demand applications that are hosted by cloud infrastructure system 702. Examples of SaaS services provided by Oracle Corporation® include, without limitation, various services for human resources/capital management, customer relationship management (CRM), enterprise resource planning (ERP), supply chain management (SCM), enterprise performance management (EPM), analytics services, social applications, and others.

An IaaS model is generally used to provide infrastructure resources (e.g., servers, storage, hardware and networking resources) to a customer as a cloud service to provide elastic compute and storage capabilities. Various IaaS services are provided by Oracle Corporation®.

A PaaS model is generally used to provide, as a service, platform and environment resources that enable customers to develop, run, and manage applications and services without the customer having to procure, build, or maintain such resources. Examples of PaaS services provided by Oracle Corporation® include, without limitation, Oracle Java Cloud Service (JCS), Oracle Database Cloud Service (DBCS), data management cloud service, various application development solutions services, and others.

Cloud services are generally provided on an on-demand self-service basis, subscription-based, elastically scalable, reliable, highly available, and secure. For example, a customer, via a subscription order, may order one or more services provided by cloud infrastructure system 702. Cloud infrastructure system 702 then performs processing to provide the services requested in the customer's subscription order. For example, in certain embodiments, the composite entity related functionalities described herein may be provided as cloud services that are subscribed to by a user/subscriber. Cloud infrastructure system 702 may be configured to provide one or even multiple cloud services.

Cloud infrastructure system 702 may provide the cloud services via different deployment models. In a public cloud model, cloud infrastructure system 702 may be owned by a third-party cloud services provider and the cloud services are offered to any general public customer, where the customer can be an individual or an enterprise. In certain other embodiments, under a private cloud model, cloud infrastructure system 702 may be operated within an organization (e.g., within an enterprise organization) and services provided to customers that are within the organization. For example, the customers may be various departments of an enterprise such as the Human Resources department, the Payroll department, etc. or even individuals within the enterprise. In certain other embodiments, under a community cloud model, the cloud infrastructure system 702 and the services provided may be shared by several organizations in a related community. Various other models such as hybrids of the above-mentioned models may also be used.

Client computing devices 704, 706, and 708 may be of different types (such as devices 602, 604, 606, and 608 depicted in FIG. 6) and may be capable of operating one or more client applications. A user may use a client device to interact with cloud infrastructure system 702, such as to request a service provided by cloud infrastructure system 702. For example, a user may use a client device to request a composite entity related service described in this disclosure.

In some embodiments, the processing performed by cloud infrastructure system 702 for providing composite entity related services may involve big data analysis. This analysis may involve using, analyzing, and manipulating large data sets to detect and visualize various trends, behaviors, relationships, etc. within the data. This analysis may be performed by one or more processors, possibly processing the data in parallel, performing simulations using the data, and the like. The data used for this analysis may include structured data (e.g., data stored in a database or structured according to a structured model) and/or unstructured data (e.g., data blobs (binary large objects)).

As depicted in the embodiment in FIG. 7, cloud infrastructure system 702 may include infrastructure resources 730 that are utilized for facilitating the provision of various cloud services offered by cloud infrastructure system 702. Infrastructure resources 730 may include, for example, processing resources, storage or memory resources, networking resources, and the like.

In certain embodiments, to facilitate efficient provisioning of these resources for supporting the various cloud services provided by cloud infrastructure system 702 for different customers, the resources may be bundled into sets of resources or resource modules (also referred to as "pods"). Each resource module or pod may comprise a pre-integrated and optimized combination of resources of one or more types. In certain embodiments, different pods may be pre-provisioned for different types of cloud services. For example, a first set of pods may be provisioned for a database service, a second set of pods, which may include a different combination of resources than a pod in the first set of pods, may be provisioned for Java service, and the like. For some services, the resources allocated for provisioning the services may be shared between the services.

Cloud infrastructure system 702 may itself internally use services 732 that are shared by different components of cloud infrastructure system 702 and which facilitate the provisioning of services by cloud infrastructure system 702. These internal shared services may include, without limitation, a security and identity service, an integration service, an enterprise repository service, an enterprise manager service, a virus scanning and white list service, a high availability, backup and recovery service, a service for enabling cloud support, an email service, a notification service, a file transfer service, and the like.

Cloud infrastructure system 702 may comprise multiple subsystems. These subsystems may be implemented in software, or hardware, or combinations thereof. As depicted in FIG. 7, the subsystems may include a user interface subsystem 712 that enables users or customers of cloud infrastructure system 702 to interact with cloud infrastructure system 702. User interface subsystem 712 may include various different interfaces such as a web interface 714, an online store interface 716 where cloud services provided by cloud infrastructure system 702 are advertised and are purchasable by a consumer, and other interfaces 718. For example, a customer may, using a client device, request (service request 734) one or more services provided by cloud infrastructure system 702 using one or more of interfaces 714, 716, and 718. For example, a customer may access the online store, browse cloud services offered by cloud infrastructure system 702, and place a subscription order for one or more services offered by cloud infrastructure system 702 that the customer wishes to subscribe to. The service request may include information identifying the customer and one or more services that the customer desires to subscribe to. For example, a customer may place a subscription order for a composite entity related service offered by cloud infrastructure system 702. As part of the order, the customer may provide information for configuring a composite entity.

In certain embodiments, such as the embodiment depicted in FIG. 7, cloud infrastructure system 702 may comprise an order management subsystem (OMS) 720 that is configured to process the new order. As part of this processing, OMS 720 may be configured to: create an account for the customer, if not done already; receive billing and/or accounting information from the customer that is to be used for billing the customer for providing the requested service to the customer; verify the customer information; upon verification, book the order for the customer; and orchestrate various workflows to prepare the order for provisioning.

Once properly validated, OMS 720 may then invoke the order provisioning subsystem (OPS) 724 that is configured to provision resources for the order including processing, memory, and networking resources. The provisioning may include allocating resources for the order and configuring the resources to facilitate the service requested by the customer order. The manner in which resources are provisioned for an order and the type of the provisioned resources may depend upon the type of cloud service that has been ordered by the customer. For example, according to one workflow, OPS 724 may be configured to determine the particular cloud service being requested and identify a number of pods that may have been pre-configured for that particular cloud service. The number of pods that are allocated for an order may depend upon the size/amount/level/scope of the requested service. For example, the number of pods to be allocated may be determined based upon the number of users to be supported by the service, the duration of time for which the service is being requested, and the like. The allocated pods may then be customized for the particular requesting customer for providing the requested service.

Cloud infrastructure system 702 may send a response or notification 744 to the requesting customer to indicate when the requested service is now ready for use. In some instances, information (e.g., a link) may be sent to the customer that enables the customer to start using and availing the benefits of the requested services. In certain embodiments, for a customer requesting the composite related service, the response may include a confirmation that a composite entity has been successfully configured and is ready to be accessed as part of executing a dialog flow definition.

Cloud infrastructure system 702 may provide services to multiple customers. For each customer, cloud infrastructure system 702 is responsible for managing information related to one or more subscription orders received from the customer, maintaining customer data related to the orders, and providing the requested services to the customer. Cloud infrastructure system 702 may also collect usage statistics regarding a customer's use of subscribed services. For example, statistics may be collected for the amount of storage used, the amount of data transferred, the number of users, and the amount of system up time and system down time, and the like. This usage information may be used to bill the customer. Billing may be done, for example, on a monthly cycle.

Cloud infrastructure system 702 may provide services to multiple customers in parallel. Cloud infrastructure system 702 may store information for these customers, including possibly proprietary information. In certain embodiments, cloud infrastructure system 702 comprises an identity management subsystem (IMS) 728 that is configured to manage customers information and provide the separation of the managed information such that information related to one customer is not accessible by another customer. IMS 728 may be configured to provide various security-related services such as identity services, such as information access management, authentication and authorization services, services for managing customer identities and roles and related capabilities, and the like.

Figure 8:
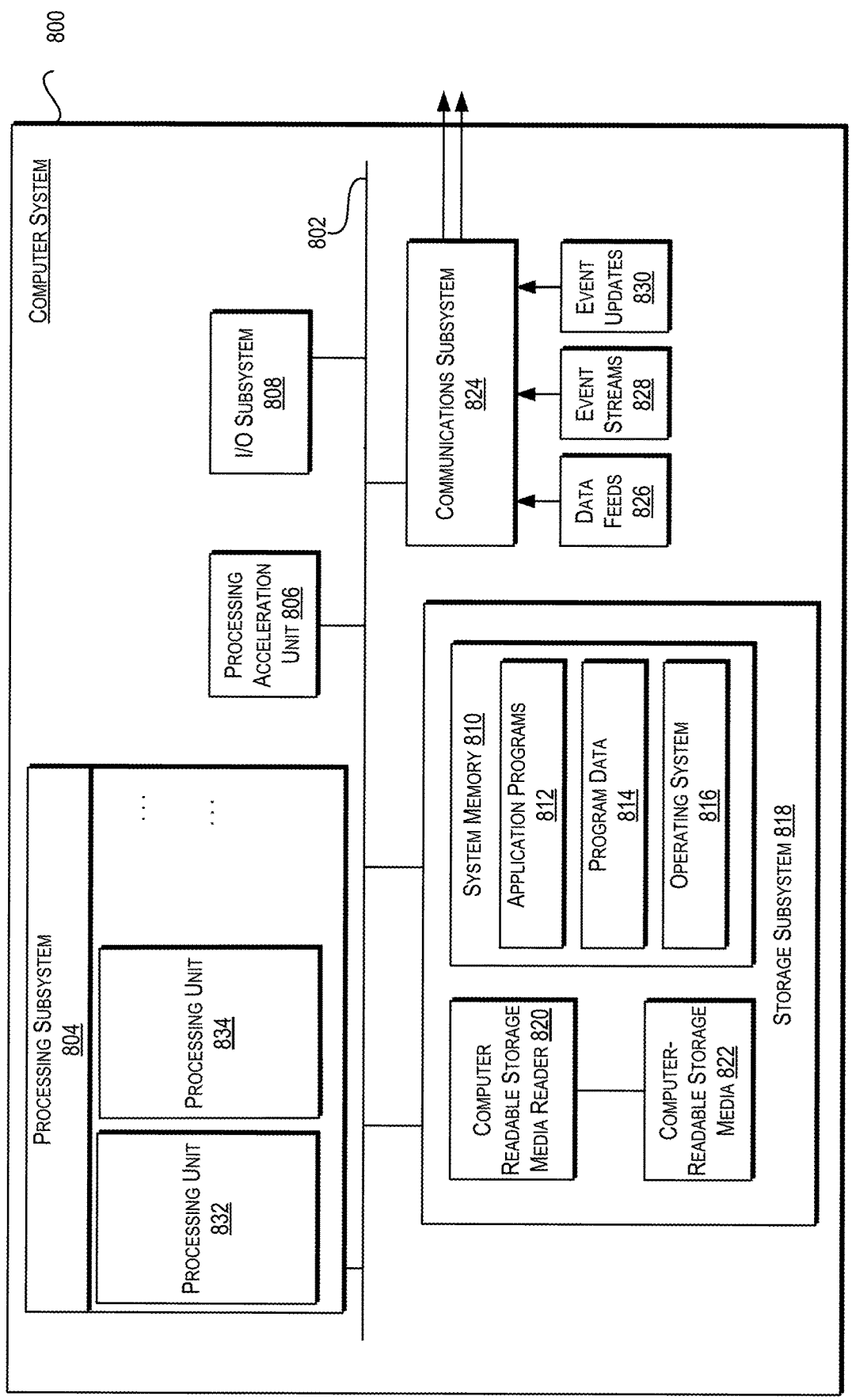
FIG. 8 illustrates an exemplary computer system that may be used to implement certain embodiments.

FIG. 8 illustrates an exemplary computer system 800 that may be used to implement certain embodiments. For example, in some embodiments, computer system 800 may be used to implement any of various servers and computer systems described above. As shown in FIG. 8, computer system 800 includes various subsystems including a processing subsystem 804 that communicates with a number of other subsystems via a bus subsystem 802. These other subsystems may include a processing acceleration unit 806, an I/O subsystem 808, a storage subsystem 818, and a communications subsystem 824. Storage subsystem 818 may include non-transitory computer-readable storage media including storage media 822 and a system memory 810.

Bus subsystem 802 provides a mechanism for letting the various components and subsystems of computer system 800 communicate with each other as intended. Although bus subsystem 802 is shown schematically as a single bus, alternative embodiments of the bus subsystem may utilize multiple buses. Bus subsystem 802 may be any of several types of bus structures including a memory bus or memory controller, a peripheral bus, a local bus using any of a variety of bus architectures, and the like. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 804 controls the operation of computer system 800 and may comprise one or more processors, application specific integrated circuits (ASICs), or field programmable gate arrays (FPGAs). The processors may include be single core or multicore processors. The processing resources of computer system 800 can be organized into one or more processing units 832, 834, etc. A processing unit may include one or more processors, one or more cores from the same or different processors, a combination of cores and processors, or other combinations of cores and processors. In some embodiments, processing subsystem 804 can include one or more special purpose co-processors such as graphics processors, digital signal processors (DSPs), or the like. In some embodiments, some or all of the processing units of processing subsystem 804 can be implemented using customized circuits, such as application specific integrated circuits (ASICs), or field programmable gate arrays (FPGAs).

In some embodiments, the processing units in processing subsystem 804 can execute instructions stored in system memory 810 or on computer readable storage media 822. In various embodiments, the processing units can execute a variety of programs or code instructions and can maintain multiple concurrently executing programs or processes. At any given time, some or all of the program code to be executed can be resident in system memory 810 and/or on computer-readable storage media 822 including potentially on one or more storage devices. Through suitable programming, processing subsystem 804 can provide various functionalities described above. In instances where computer system 800 is executing one or more virtual machines, one or more processing units may be allocated to each virtual machine.

In certain embodiments, a processing acceleration unit 806 may optionally be provided for performing customized processing or for off-loading some of the processing performed by processing subsystem 804 so as to accelerate the overall processing performed by computer system 800.

I/O subsystem 808 may include devices and mechanisms for inputting information to computer system 800 and/or for outputting information from or via computer system 800. In general, use of the term input device is intended to include all possible types of devices and mechanisms for inputting information to computer system 800. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as inputs to an input device (e.g., Google Glass®). Additionally, user interface input devices may include voice recognition sensing devices that enable users to interact with voice recognition systems (e.g., Siri® navigator) through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, and medical ultrasonography devices. User interface input devices may also include, for example, audio input devices such as MIDI keyboards, digital musical instruments and the like.

In general, use of the term output device is intended to include all possible types of devices and mechanisms for outputting information from computer system 800 to a user or other computer. User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 818 provides a repository or data store for storing information and data that is used by computer system 800. Storage subsystem 818 provides a tangible non-transitory computer-readable storage medium for storing the basic programming and data constructs that provide the functionality of some embodiments. Storage subsystem 818 may store software (e.g., programs, code modules, instructions) that when executed by processing subsystem 804 provides the functionality described above. The software may be executed by one or more processing units of processing subsystem 804. Storage subsystem 818 may also provide a repository for storing data used in accordance with the teachings of this disclosure.

Storage subsystem 818 may include one or more non-transitory memory devices, including volatile and non-volatile memory devices. As shown in FIG. 8, storage subsystem 818 includes a system memory 810 and a computer-readable storage media 822. System memory 810 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 800, such as during start-up, may typically be stored in the ROM. The RAM may contain data and/or program modules that are presently being operated and executed by processing subsystem 804. In some implementations, system memory 810 may include multiple different types of memory, such as static random access memory (SRAM), dynamic random access memory (DRAM), and the like.

By way of example, and not limitation, as depicted in FIG. 8, system memory 810 may load application programs 812 that are being executed, which may include various applications such as Web browsers, mid-tier applications, relational database management systems (RDBMS), etc., program data 814, and an operating system 816. By way of example, operating system 816 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, Palm® OS operating systems, and others.

Computer-readable storage media 822 may store programming and data constructs that provide the functionality of some embodiments. Computer-readable media 822 may provide storage of computer-readable instructions, data structures, program modules, and other data for computer system 800. Software (programs, code modules, instructions) that, when executed by processing subsystem 804 provides the functionality described above, may be stored in storage subsystem 818. By way of example, computer-readable storage media 822 may include non-volatile memory such as a hard disk drive, a magnetic disk drive, an optical disk drive such as a CD ROM, DVD, a Blu-Ray® disk, or other optical media. Computer-readable storage media 822 may include, but is not limited to, Zip® drives, flash memory cards, universal serial bus (USB) flash drives, secure digital (SD) cards, DVD disks, digital video tape, and the like. Computer-readable storage media 822 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs.

In certain embodiments, storage subsystem 818 may also include a computer-readable storage media reader 820 that can further be connected to computer-readable storage media 822. Reader 820 may receive and be configured to read data from a memory device such as a disk, a flash drive, etc.

In certain embodiments, computer system 800 may support virtualization technologies, including but not limited to virtualization of processing and memory resources. For example, computer system 800 may provide support for executing one or more virtual machines. In certain embodiments, computer system 800 may execute a program such as a hypervisor that facilitated the configuring and managing of the virtual machines. Each virtual machine may be allocated memory, compute (e.g., processors, cores), I/O, and networking resources. Each virtual machine generally runs independently of the other virtual machines. A virtual machine typically runs its own operating system, which may be the same as or different from the operating systems executed by other virtual machines executed by computer system 800. Accordingly, multiple operating systems may potentially be run concurrently by computer system 800.

Communications subsystem 824 provides an interface to other computer systems and networks. Communications subsystem 824 serves as an interface for receiving data from and transmitting data to other systems from computer system 800. For example, communications subsystem 824 may enable computer system 800 to establish a communication channel to one or more client devices via the Internet for receiving and sending information from and to the client devices. For example, the communication subsystem may be used for communications between a master bot and an individual bot in connection with a routing decision, or for communications between an individual bot and a user after the user has been routed to the individual bot.

Communication subsystem 824 may support both wired and/or wireless communication protocols. For example, in certain embodiments, communications subsystem 824 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.XX family standards, or other mobile communication technologies, or any combination thereof), global positioning system (GPS) receiver components, and/or other components. In some embodiments communications subsystem 824 can provide wired network connectivity (e.g., Ethernet) in addition to or instead of a wireless interface.

Communication subsystem 824 can receive and transmit data in various forms. For example, in some embodiments, in addition to other forms, communications subsystem 824 may receive input communications in the form of structured and/or unstructured data feeds 826, event streams 828, event updates 830, and the like. For example, communications subsystem 824 may be configured to receive (or send) data feeds 826 in real-time from users of social media networks and/or other communication services such as Twitter® feeds, Facebook® updates, web feeds such as Rich Site Summary (RSS) feeds, and/or real-time updates from one or more third party information sources.

In certain embodiments, communications subsystem 824 may be configured to receive data in the form of continuous data streams, which may include event streams 828 of real-time events and/or event updates 830, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 824 may also be configured to communicate data from computer system 800 to other computer systems or networks. The data may be communicated in various different forms such as structured and/or unstructured data feeds 826, event streams 828, event updates 830, and the like to one or more databases that may be in communication with one or more streaming data source computers coupled to computer system 800.

Computer system 800 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system. Due to the ever-changing nature of computers and networks, the description of computer system 800 depicted in FIG. 8 is intended only as a specific example. Many other configurations having more or fewer components than the system depicted in FIG. 8 are possible. Based on the disclosure and teachings provided herein, a person of ordinary skill in the art will appreciate other ways and/or methods to implement the various embodiments.

Although specific embodiments have been described, various modifications, alterations, alternative constructions, and equivalents are possible. Embodiments are not restricted to operation within certain specific data processing environments, but are free to operate within a plurality of data processing environments. Additionally, although certain embodiments have been described using a particular series of transactions and steps, it should be apparent to those skilled in the art that this is not intended to be limiting. Although some flowcharts describe operations as a sequential process, many of the operations can be performed in parallel or concurrently. In addition, the order of the operations may be rearranged. A process may have additional steps not included in the figure. Various features and aspects of the above-described embodiments may be used individually or jointly.

Further, while certain embodiments have been described using a particular combination of hardware and software, it should be recognized that other combinations of hardware and software are also possible. Certain embodiments may be implemented only in hardware, or only in software, or using combinations thereof. The various processes described herein can be implemented on the same processor or different processors in any combination.

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques including but not limited to conventional techniques for inter-process communications, and different pairs of processes may use different techniques, or the same pair of processes may use different techniques at different times.

Specific details are given in this disclosure to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of other embodiments. Rather, the preceding description of the embodiments will provide those skilled in the art with an enabling description for implementing various embodiments. Various changes may be made in the function and arrangement of elements.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific embodiments have been described, these are not intended to be limiting. Various modifications and equivalents are within the scope of the following claims.

What is claimed is:

1. A computer-implemented method comprising:
accessing a plurality of utterances received as part of a conversation between an end user and a chatbot of a chatbot system, the plurality of utterances comprising a first set of entities;
determining, based on the plurality of utterances and a dialog flow definition associated with the conversation, that at least one utterance of the plurality of utterances references a particular component of the dialog flow definition;
in response to determining that the at least one utterance references the particular component, identifying entities included in a second set of entities that are not included in the first set of entities, the second set of entities associated with a component definition of the particular component; and
generating a plurality of prompts for the conversation, at least one prompt of the plurality of prompt configured to prompt the end user to supply information corresponding to at least one entity of the entities included in the second set of entities that are not included in the first set of entities.

2. The method of claim 1, further comprising:
causing the chatbot to present the at least one prompt to the end user.

3. The method of claim 2, wherein the plurality of utterances is a plurality of first utterances, and wherein the computer-implemented method further comprises:
accessing a plurality of second utterances received as part of the conversation and in response to the chatbot presenting the at least one prompt.

4. The method of claim 3, the computer-implemented method further comprising:
causing the chatbot to present at least one response to the end user, wherein the at least one response is generated based on the dialog flow definition and in response to determining that each entity in the second set of entities is associated with at least one piece of information included in at least one of the plurality of first utterances and the plurality of second utterances.

5. The method of claim 3, the computer-implemented method further comprising:
causing the chatbot to present at least one response to the end user, wherein the at least one response is generated based on the dialog flow definition and in response to determining that information included in the plurality of second utterances does not correspond to any entities in the second set of entities.

6. The method of claim 1, wherein the at least one prompt is generated based on the component definition.

7. The method of claim 1, wherein the dialog flow definition and the component definition are stored as separate components of the chatbot system.

8. A system comprising:
one or more processors; and
a memory coupled to the one or more processors, the memory storing instructions that, when executed by the one or more processors, causes the system to perform operations comprising:
accessing a plurality of utterances received as part of a conversation between an end user and a chatbot of a chatbot system, the plurality of utterances comprising a first set of entities;
determining, based on the plurality of utterances and a dialog flow definition associated with the conversation, that at least one utterance of the plurality of utterances references a particular component of the dialog flow definition;
in response to determining that the at least one utterance references the particular component, identifying entities included in a second set of entities that are not included in the first set of entities, the second set of entities associated with a component definition of the particular component; and
generating a plurality of prompts for the conversation, at least one prompt of the plurality of prompt configured to prompt the end user to supply information corresponding to at least one entity of the entities included in the second set of entities that are not included in the first set of entities.

9. The system of claim 8, the operations further comprising:
causing the chatbot to present the at least one prompt to the end user.

10. The system of claim 9, wherein the plurality of utterances is a plurality of first utterances, and wherein the operations further comprise:
accessing a plurality of second utterances received as part of the conversation and in response to the chatbot presenting the at least one prompt.

11. The system of claim 10, the operations further comprising:
causing the chatbot to present at least one response to the end user, wherein the at least one response is generated based on the dialog flow definition and in response to determining that each entity in the second set of entities is associated with at least one piece of information included in at least one of the plurality of first utterances and the plurality of second utterances.

12. The system of claim 10, the operations further comprising:
causing the chatbot to present at least one response to the end user, wherein the at least one response is generated based on the dialog flow definition and in response to determining that information included in the plurality of second utterances does not correspond to any entities in the second set of entities.

13. The system of claim 8, wherein the at least one prompt is generated based on the component definition.

14. The system of claim 8, wherein the dialog flow definition and the component definition are stored as separate components of the chatbot system.

15. A non-transitory computer-readable memory storing instructions that, when executed by one or more processors, causes a system to perform operations comprising:
accessing a plurality of utterances received as part of a conversation between an end user and a chatbot of a chatbot system, the plurality of utterances comprising a first set of entities;

determining, based on the plurality of utterances and a dialog flow definition associated with the conversation, that at least one utterance of the plurality of utterances references a particular component of the dialog flow definition;

in response to determining that the at least one utterance references the particular component, identifying entities included in a second set of entities that are not included in the first set of entities, the second set of entities associated with a component definition of the particular component; and generating a plurality of prompts for the conversation, at least one prompt of the plurality of prompt configured to prompt the end user to supply information corresponding to at least one entity of the entities included in the second set of entities that are not included in the first set of entities.

16. The non-transitory computer-readable memory of claim 15, the operations further comprising:

causing the chatbot to present the at least one prompt to the end user.

17. The non-transitory computer-readable memory of claim 16, wherein the plurality of utterances is a plurality of first utterances, and wherein the operations further comprise:

accessing a plurality of second utterances received as part of the conversation and in response to the chatbot presenting the at least one prompt.

18. The non-transitory computer-readable memory of claim 17, the operations further comprising:

causing the chatbot to present at least one response to the end user, wherein the at least one response is generated based on the dialog flow definition and in response to determining that each entity in the second set of entities is associated with at least one piece of information included in at least one of the plurality of first utterances and the plurality of second utterances.

19. The non-transitory computer-readable memory of claim 17, the operations further comprising:

causing the chatbot to present at least one response to the end user, wherein the at least one response is generated based on the dialog flow definition and in response to determining that information included in the plurality of second utterances does not correspond to any entities in the second set of entities.

20. The non-transitory computer-readable memory of claim 15, wherein the at least one prompt is generated based on the component definition.

* * * * *

UNITED STATES PATENT AND TRADEMARK OFFICE
CERTIFICATE OF CORRECTION

PATENT NO. : 12,373,648 B2  
APPLICATION NO. : 18/618760  
DATED : July 29, 2025  
INVENTOR(S) : Gadde et al.

Page 1 of 1

It is certified that error appears in the above-identified patent and that said Letters Patent is hereby corrected as shown below:

On the Title Page

Column 1, item (72) under inventors, Line 5, delete "Herdon," and insert -- Herndon, --, therefor.

In the Specification

In Column 12, Line 7, delete ""System. Intent"" and insert -- "System.Intent" --, therefor.

In Column 13, Lines 24-25, delete "System. Intent" and insert -- System.Intent --, therefor.

In Column 14, Lines 28-29, delete "System. ResolveEntities" and insert -- System.ResolveEntities --, therefor.

In Column 15, Line 18, delete "Pizza Toppings" and insert -- PizzaToppings --, therefor.

In Columns 23-24, Line 15, delete "Canadian" and insert -- canadian --, therefor.

In Columns 23-24, Line 26, delete ""${expense.value.Amount.amont" and insert -- "${expense.value.Amount.amount --.

In Column 26, Line 31, delete "Xbox®)" and insert -- Xbox® --, therefor.

In Column 26, Line 50, delete "infra-red" and insert -- infrared --, therefor.

Signed and Sealed this  
Sixteenth Day of December, 2025

John A. Squires  
*Director of the United States Patent and Trademark Office*